US012750497B2

United States Patent

Park et al.

(10) Patent No.: US 12,750,497 B2

(45) Date of Patent: Sep. 29, 2026

(54) IMAGE ENCODING/DECODING METHOD AND DEVICE, AND RECORDING MEDIUM HAVING BITSTREAM STORED THEREON

(71) Applicant: LG Electronics Inc., Seoul (KR)

(72) Inventors: Naeri Park, Seoul (KR); Junghak Nam, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 18/847,923

(22) PCT Filed: Apr. 12, 2023

(86) PCT No.: PCT/KR2023/004924

§ 371 (c)(1),
(2) Date: Sep. 17, 2024

(87) PCT Pub. No.: WO2023/200242

PCT Pub. Date: Oct. 19, 2023

(65) Prior Publication Data

US 2025/0203093 A1 Jun. 19, 2025

Related U.S. Application Data

(60) Provisional application No. 63/330,273, filed on Apr. 12, 2022.

(51) Int. Cl.

| | |
|---|---|
| ***H04N 19/159*** | (2014.01) |
| ***H04N 19/176*** | (2014.01) |
| ***H04N 19/70*** | (2014.01) |

(52) U.S. Cl.

CPC ......... *H04N 19/159* (2014.11); *H04N 19/176* (2014.11); *H04N 19/70* (2014.11)

(58) Field of Classification Search

CPC .... H04N 19/159; H04N 19/176; H04N 19/70; H04N 19/105; H04N 19/109; H04N 19/157; H04N 19/52; H04N 19/577

See application file for complete search history.

(56) References Cited

U.S. PATENT DOCUMENTS

| | | | | |
|---|---|---|---|---|
| 2008/0089411 | A1* | 4/2008 | Wenger ................ | H04N 19/105 375/E7.243 |
| 2016/0301947 | A1* | 10/2016 | Chen .................... | H04N 19/573 |

(Continued)

FOREIGN PATENT DOCUMENTS

| | | | |
|---|---|---|---|
| KR | 10-2022-0027157 | A | 3/2022 |
| KR | 10-2383105 | B1 | 4/2022 |

OTHER PUBLICATIONS

International Search Report and Written Opinion in International Appln. No. PCT/KR2023/004924, mailed on Jul. 24, 2023, 9 pages (with partial English translation).

(Continued)

*Primary Examiner* — Jared Walker

(74) *Attorney, Agent, or Firm* — Fish & Richardson P.C.

(57) ABSTRACT

An image encoding/decoding method and device according to the present disclosure may: perform bi-directional prediction on the basis of a first inter prediction mode to generate a basic prediction block of a current block; generate an additional prediction block of the current block on the basis of a second inter prediction mode; and calculate a weighted sum of the basic prediction block and the additional prediction block to generate a final prediction block of the current block.

11 Claims, 8 Drawing Sheets

(56) References Cited

U.S. PATENT DOCUMENTS

| | | | | |
|---|---|---|---|---|
| 2017/0064300 | A1* | 3/2017 | Yang | H04N 19/172 |
| 2018/0270485 | A1* | 9/2018 | Jang | H04N 19/503 |
| 2020/0169757 | A1* | 5/2020 | Chiang | H04N 19/103 |
| 2020/0252640 | A1* | 8/2020 | Zhao | H04N 19/105 |
| 2020/0275115 | A1* | 8/2020 | Chiang | H04N 19/70 |
| 2020/0382808 | A1* | 12/2020 | Mullakhmetov | H04N 19/567 |
| 2021/0144392 | A1* | 5/2021 | Zhang | H04N 19/107 |
| 2021/0160533 | A1* | 5/2021 | Zhang | H04N 19/70 |
| 2021/0274214 | A1* | 9/2021 | Moon | H04N 19/46 |
| 2021/0392334 | A1* | 12/2021 | Esenlik | H04N 19/117 |
| 2022/0150544 | A1* | 5/2022 | Deng | H04N 19/172 |
| 2022/0368916 | A1* | 11/2022 | Zhang | H04N 19/176 |
| 2022/0417507 | A1* | 12/2022 | Oh | H04N 19/423 |
| 2023/0095684 | A1* | 3/2023 | Bordes | H04N 19/136<br>375/240.26 |

OTHER PUBLICATIONS

Winken et al., "EE2-3.8: Multiple Hypothesis Prediction," JVET-V0077, Joint Video Experts Team (JVET) of ITU-T SG 16 WP 3 and ISO/IEC JTC 1/SC 29, 22nd Meeting, by teleconference, Apr. 20-28, 2021, 3 pages.

Zhang et al., "EE2-related: Bilateral matching AMVP-merge mode," JVET-W0106-v3, Joint Video Experts Team (JVET) of ITU-T SG 16 WP 3 and ISO/IEC JTC 1/SC 29, 23rd, Meeting, by teleconference, Jul. 7-16, 2021, 2 pages.

Chang et al., "Compression efficiency methods beyond VVC," JVET-U0100, Joint Video Experts Team (JVET) of ITU-T SG 16 WP 3 and 1S0/IEC JTC 1/SC 29, 21st Meeting, by teleconference, Jan. 6-15, 2021, 13 pages.

Extended European Search Report in European Appln. No. 23788591.8, mailed on Mar. 23, 2026, 13 pages.

Ohm et al., "Meeting Report of the 26th Meeting of the Joint Video Experts Team (JVET)," JVET-Z1000-v1, Joint Video Experts Team (JVET) of ITU-T SG 16 WP 3 and ISO/IEC JTC 1/SC 29, 26th Meeting, by teleconference, Apr. 20-29, 2022, 222 pages.

Park et al., "Non-EE2: Fix on MHP parsing condition," JVET-Z0083-v3, Joint Video Experts Team (JVET) of ITU-T SG 16 WP 3 and 1S0/IEC JTC 1/SC 29, 26th Meeting, by teleconference, Apr. 20-29, 2022, 5 pages.

Winken et al., "CEIO: Multi-hypothesis inter prediction (Test 10.1.2)," JVET-M0425-vl, Joint Video Experts Team (JVET) of ITU-T SG 16 WP 3 and 1SO/IEC JTC 1/SC 29/WG 11, 13th Meeting: Marrakech, MA, Jan. 9-18, 2019, 12 pages.

Yu, "AHG12: Fix for parsing of MHP information in ECM," JVET-Z0063-v2, Joint Video Experts Team (JVET) of ITU-T SG 16 WP 3 and 1S0/IEC JTC 1/SC 29, 26th Meeting, by teleconference, Apr. 20-29, 2022, 4 pages.

* cited by examiner

IMAGE ENCODING/DECODING METHOD AND DEVICE, AND RECORDING MEDIUM HAVING BITSTREAM STORED THEREON

CROSS-REFERENCE TO RELATED APPLICATIONS

This application is a National Stage application under 35 U.S.C. § 371 of International Application No. PCT/KR2023/004924, filed on Apr. 12, 2023, which claims the benefit of U.S. Provisional Application No. 63/330,273, filed on Apr. 12, 2022. The disclosures of the prior applications are incorporated by reference in their entirety.

TECHNICAL FIELD

The present disclosure relates to an image encoding/decoding method and device, and a recording medium storing a bitstream.

BACKGROUND ART

Recently, the demand for high-resolution and high-quality images such as HD (High Definition) images and UHD (Ultra High Definition) images has been increasing in various application fields, and accordingly, highly efficient image compression technologies are being discussed.

There are a variety of technologies such as inter-prediction technology that predicts a pixel value included in a current picture from a picture before or after a current picture with video compression technology, intra-prediction technology that predicts a pixel value included in a current picture by using pixel information in a current picture, entropy coding technology that allocates a short sign to a value with high appearance frequency and a long sign to a value with low appearance frequency, etc. and these image compression technologies may be used to effectively compress image data and transmit or store it.

SUMMARY

The present disclosure provides a method and a device for performing inter prediction based on a multi-hypothesis prediction mode.

The present disclosure provides a method and a device for defining a syntax parsing condition and order between various inter prediction modes including a multi-hypothesis prediction mode.

An image decoding method and device according to the present disclosure may perform bidirectional prediction based on a first inter prediction mode to generate a basic prediction block of a current block, generate an additional prediction block of the current block based on a second inter prediction mode and generate a final prediction block of the current block by weighed summing of the basic prediction block and the additional prediction block.

In an image decoding method and device according to the present disclosure, the first inter prediction mode may include at least one of a merge mode, an AMVP mode or a merge-AMVP combined mode.

In an image decoding method and device according to the present disclosure, the second inter prediction mode may include a multi-hypothesis prediction mode.

In an image decoding method and device according to the present disclosure, when a plurality of additional prediction blocks are generated, the final prediction block may be generated by sequentially weighted summing the plurality of additional prediction blocks to the basic prediction block.

An image decoding method and device according to the present disclosure may further include acquiring information on the second inter prediction mode from a bitstream.

In an image decoding method and device according to the present disclosure, information on the second inter prediction mode may include at least one of weight information or prediction information.

In an image decoding method and device according to the present disclosure, the weight information may represent information indicating a weight used for a weighted sum of the additional prediction block.

In an image decoding method and device according to the present disclosure, the prediction information may represent information for deriving the additional prediction block.

In an image decoding method and device according to the present disclosure, the prediction information may include a mode flag indicating whether a merge mode or an AMVP mode is used to derive the additional prediction block.

In an image decoding method and device according to the present disclosure, when the mode flag indicates that a merge mode is used to derive the additional prediction block, the prediction information may further include a merge index.

In an image decoding method and device according to the present disclosure, when the mode flag indicates that an AMVP mode is used to derive the additional prediction block, the prediction information may include at least one of a motion vector predictor flag, a reference index or motion vector difference information.

In an image decoding method and device according to the present disclosure, information on the second inter prediction mode may be acquired from a bitstream when a predefined condition is satisfied.

In an image decoding method and device according to the present disclosure, the predefined condition may be defined without considering Adaptive Motion Vector Resolution (AMVR) information.

An image decoding method and device according to the present disclosure may acquire Adaptive Motion Vector Resolution (AMVR) information from a bitstream.

In an image decoding method and device according to the present disclosure, acquiring the AMVR information may be performed before acquiring information on the second inter prediction mode.

An image decoding method and device according to the present disclosure may acquire a Motion Vector Sign Derivation (MVSD) index that specifies a candidate among a plurality of sign combination candidates from a bitstream.

In an image decoding method and device according to the present disclosure, acquiring the MVSD index may be performed before acquiring information on the second inter prediction mode.

An image encoding method and device according to the present disclosure may perform bidirectional prediction based on a first inter prediction mode to generate a basic prediction block of a current block, generate an additional prediction block of the current block based on a second inter prediction mode and generate a final prediction block of the current block by weighted summing of the basic prediction block and the additional prediction block.

A computer-readable digital storage medium storing encoded video/image information resulting in performing an image decoding method due to a decoding device according to the present disclosure is provided.

A computer-readable digital storage medium storing video/image information generated according to an image encoding method according to the present disclosure is provided.

A method and a device for transmitting video/image information generated according to an image encoding method according to the present disclosure are provided.

The present disclosure may improve the accuracy of prediction by performing inter prediction based on a multi-hypothesis prediction mode.

The present disclosure may improve a syntax structure and enhance compression performance by defining a syntax parsing condition and order between various inter prediction modes including a multi-hypothesis prediction mode.

DETAILED DESCRIPTION

Figure 1:
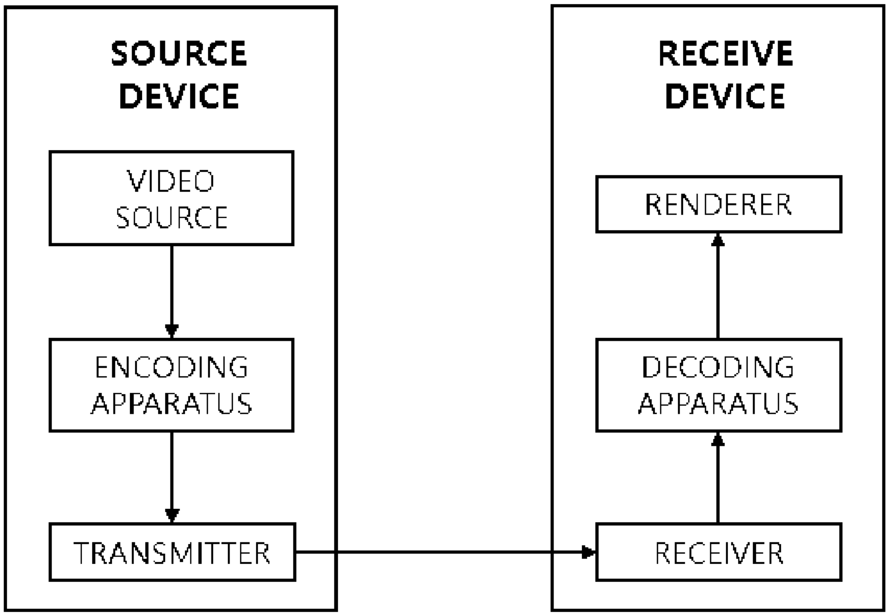
FIG. 1 shows a video/image coding system according to the present disclosure.

Since the present disclosure may make various changes and have several embodiments, specific embodiments will be illustrated in a drawing and described in detail in a detailed description. However, it is not intended to limit the present disclosure to a specific embodiment, and should be understood to include all changes, equivalents and substitutes included in the spirit and technical scope of the present disclosure. While describing each drawing, similar reference numerals are used for similar components.

A term such as first, second, etc. may be used to describe various components, but the components should not be limited by the terms. The terms are used only to distinguish one component from other components. For example, a first component may be referred to as a second component without departing from the scope of a right of the present disclosure, and similarly, a second component may also be referred to as a first component. A term of and/or includes any of a plurality of related stated items or a combination of a plurality of related stated items.

When a component is referred to as "being connected" or "being linked" to another component, it should be understood that it may be directly connected or linked to another component, but another component may exist in the middle. On the other hand, when a component is referred to as "being directly connected" or "being directly linked" to another component, it should be understood that there is no another component in the middle.

A term used in this application is just used to describe a specific embodiment, and is not intended to limit the present disclosure. Singular expressions include plural expressions unless the context clearly dictates otherwise. In this application, it should be understood that a term such as "include" or "have", etc. is intended to designate the presence of features, numbers, steps, operations, components, parts or combinations thereof described in the specification, but does not exclude in advance the possibility of presence or addition of one or more other features, numbers, steps, operations, components, parts or combinations thereof.

The present disclosure relates to video/image coding. For example, a method/an embodiment disclosed herein may be applied to a method disclosed in the versatile video coding (VVC) standard. In addition, a method/an embodiment disclosed herein may be applied to a method disclosed in the essential video coding (EVC) standard, the AOMedia Video 1 (AV1) standard, the 2nd generation of audio video coding standard (AVS2) or the next-generation video/image coding standard (ex. H.267 or H.268, etc.).

This specification proposes various embodiments of video/image coding, and unless otherwise specified, the embodiments may be performed in combination with each other.

Herein, a video may refer to a set of a series of images over time. A picture generally refers to a unit representing one image in a specific time period, and a slice/a tile is a unit that forms part of a picture in coding. A slice/a tile may include at least one coding tree unit (CTU). One picture may consist of at least one slice/tile. One tile is a rectangular area composed of a plurality of CTUs within a specific tile column and a specific tile row of one picture. A tile column is a rectangular area of CTUs having the same height as that of a picture and a width designated by a syntax requirement of a picture parameter set. A tile row is a rectangular area of CTUs having a height designated by a picture parameter set and the same width as that of a picture. CTUs within one tile may be arranged consecutively according to CTU raster scan, while tiles within one picture may be arranged consecutively according to raster scan of a tile. One slice may include an integer number of complete tiles or an integer number of consecutive complete CTU rows within a tile of a picture that may be included exclusively in a single NAL unit. Meanwhile, one picture may be divided into at least two sub-pictures. A sub-picture may be a rectangular area of at least one slice within a picture.

A pixel, a pixel or a pel may refer to the minimum unit that constitutes one picture (or image). In addition, 'sample' may be used as a term corresponding to a pixel. A sample may generally represent a pixel or a pixel value, and may represent only a pixel/a pixel value of a luma component, or only a pixel/a pixel value of a chroma component.

A unit may represent a basic unit of image processing. A unit may include at least one of a specific area of a picture and information related to a corresponding area. One unit may include one luma block and two chroma (ex. cb, cr) blocks. In some cases, a unit may be used interchangeably with a term such as a block or an area, etc. In a general case, a M×N block may include a set (or an array) of transform coefficients or samples (or sample arrays) consisting of M columns and N rows.

Herein, "A or B" may refer to "only A", "only B" or "both A and B." In other words, herein, "A or B" may be interpreted as "A and/or B." For example, herein, "A, B or C" may refer to "only A", "only B", "only C" or "any combination of A, B and C)".

A slash (/) or a comma used herein may refer to "and/or." For example, "A/B" may refer to "A and/or B." Accordingly, "A/B" may refer to "only A", "only B" or "both A and B." For example, "A, B, C" may refer to "A, B, or C".

Herein, "at least one of A and B" may refer to "only A", "only B" or "both A and B". In addition, herein, an expression such as "at least one of A or B" or "at least one of A and/or B" may be interpreted in the same way as "at least one of A and B".

In addition, herein, "at least one of A, B and C" may refer to "only A", "only B", "only C", or "any combination of A, B and C". In addition, "at least one of A, B or C" or "at least one of A, B and/or C" may refer to "at least one of A, B and C".

In addition, a parenthesis used herein may refer to "for example." Specifically, when indicated as "prediction (intra prediction)", "intra prediction" may be proposed as an example of "prediction". In other words, "prediction" herein is not limited to "intra prediction" and "intra prediction" may be proposed as an example of "prediction." In addition, even when indicated as "prediction (i.e., intra prediction)", "intra prediction" may be proposed as an example of "prediction."

Herein, a technical feature described individually in one drawing may be implemented individually or simultaneously.

FIG. 1 shows a video/image coding system according to the present disclosure.

Referring to FIG. 1, a video/image coding system may include a first device (a source device) and a second device (a receiving device).

A source device may transmit encoded video/image information or data in a form of a file or streaming to a receiving device through a digital storage medium or a network. The source device may include a video source, an encoding device and a transmission unit. The receiving device may include a reception unit, a decoding device and a renderer. The encoding device may be referred to as a video/image encoding device and the decoding device may be referred to as a video/image decoding device. A transmitter may be included in an encoding device. A receiver may be included in a decoding device. A renderer may include a display unit, and a display unit may be composed of a separate device or an external component.

A video source may acquire a video/an image through a process of capturing, synthesizing or generating a video/an image. A video source may include a device of capturing a video/an image and a device of generating a video/an image. A device of capturing a video/an image may include at least one camera, a video/image archive including previously captured videos/images, etc. A device of generating a video/an image may include a computer, a tablet, a smartphone, etc. and may (electronically) generate a video/an image. For example, a virtual video/image may be generated through a computer, etc., and in this case, a process of capturing a video/an image may be replaced by a process of generating related data.

An encoding device may encode an input video/image. An encoding device may perform a series of procedures such as prediction, transform, quantization, etc. for compression and coding efficiency. Encoded data (encoded video/image information) may be output in a form of a bitstream.

A transmission unit may transmit encoded video/image information or data output in a form of a bitstream to a reception unit of a receiving device through a digital storage medium or a network in a form of a file or streaming. A digital storage medium may include various storage media such as USB, SD, CD, DVD, Blu-ray, HDD, SSD, etc. A transmission unit may include an element for generating a media file through a predetermined file format and may include an element for transmission through a broadcasting/communication network. A reception unit may receive/extract the bitstream and transmit it to a decoding device.

A decoding device may decode a video/an image by performing a series of procedures such as dequantization, inverse transform, prediction, etc. corresponding to an operation of an encoding device.

A renderer may render a decoded video/image. A rendered video/image may be displayed through a display unit.

Figure 2:
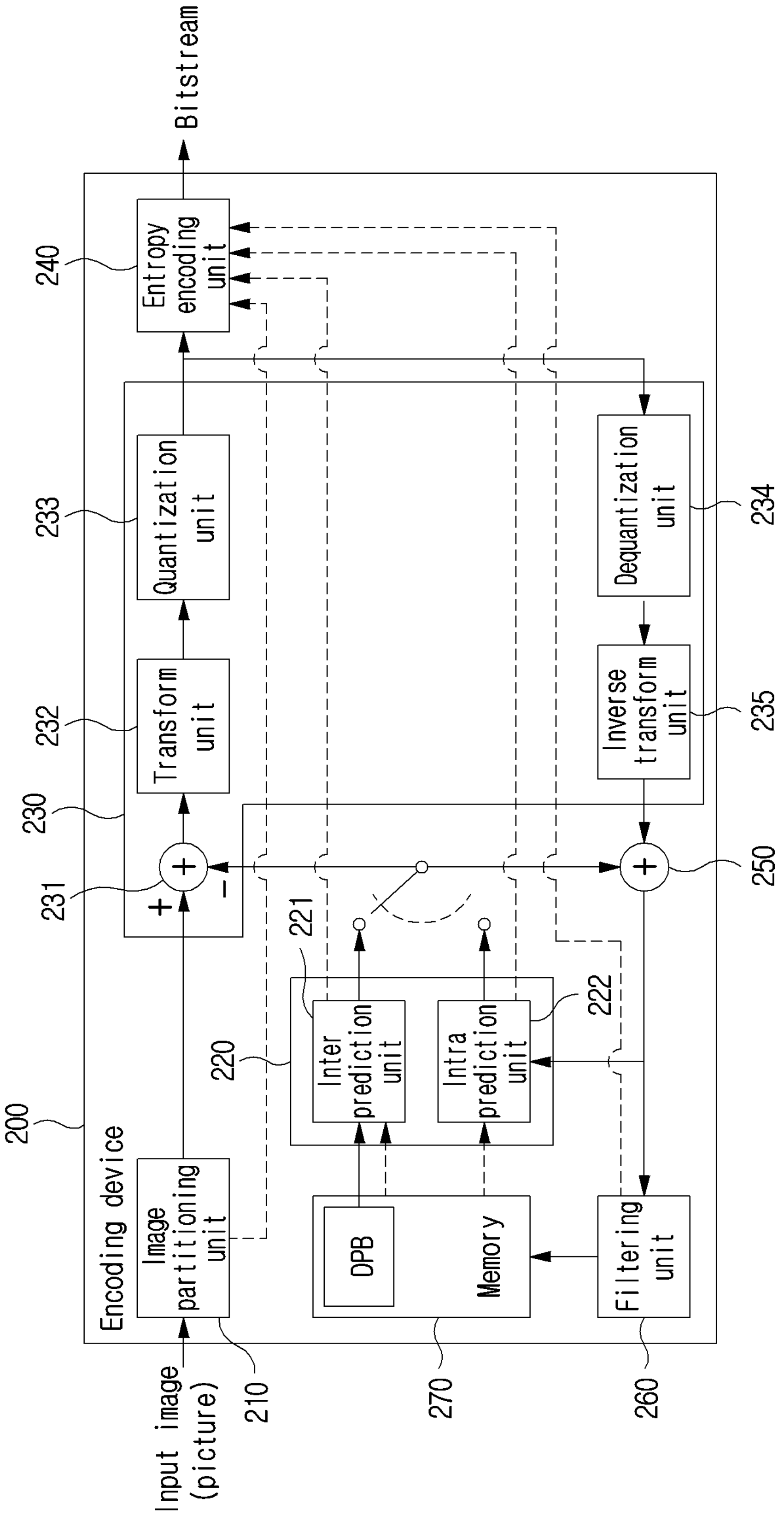
FIG. 2 shows a rough block diagram of an encoding device to which an embodiment of the present disclosure may be applied and encoding of a video/image signal is performed.

FIG. 2 shows a rough block diagram of an encoding device to which an embodiment of the present disclosure may be applied and encoding of a video/image signal is performed.

Referring to FIG. 2, an encoding device 200 may be composed of an image partitioner 210, a predictor 220, a residual processor 230, an entropy encoder 240, an adder 250, a filter 260 and a memory 270. A predictor 220 may include an inter predictor 221 and an intra predictor 222. A residual processor 230 may include a transformer 232, a quantizer 233, a dequantizer 234 and an inverse transformer 235. A residual processor 230 may further include a subtractor 231. An adder 250 may be referred to as a reconstructor or a reconstructed block generator. The above-described image partitioner 210, predictor 220, residual processor 230, entropy encoder 240, adder 250 and filter 260 may be configured by at least one hardware component (e.g., an encoder chipset or a processor) according to an embodiment. In addition, a memory 270 may include a decoded picture buffer (DPB) and may be configured by a digital storage medium. The hardware component may further include a memory 270 as an internal/external component.

An image partitioner 210 may partition an input image (or picture, frame) input to an encoding device 200 into at least one processing unit. As an example, the processing unit may be referred to as a coding unit (CU). In this case, a coding unit may be partitioned recursively according to a quad-tree binary-tree ternary-tree (QTBTTT) structure from a coding tree unit (CTU) or the largest coding unit (LCU).

For example, one coding unit may be partitioned into a plurality of coding units with a deeper depth based on a quad tree structure, a binary tree structure and/or a ternary structure. In this case, for example, a quad tree structure may be applied first and a binary tree structure and/or a ternary structure may be applied later. Alternatively, a binary tree structure may be applied before a quad tree structure. A coding procedure according to this specification may be performed based on a final coding unit that is no longer partitioned. In this case, based on coding efficiency, etc. according to an image characteristic, the largest coding unit may be directly used as a final coding unit, or if necessary, a coding unit may be recursively partitioned into coding units of a deeper depth, and a coding unit with an optimal size may be used as a final coding unit. Here, a coding procedure may include a procedure such as prediction, transform, and reconstruction, etc. described later.

As another example, the processing unit may further include a prediction unit (PU) or a transform unit (TU). In this case, the prediction unit and the transform unit may be divided or partitioned from a final coding unit described above, respectively. The prediction unit may be a unit of sample prediction, and the transform unit may be a unit for deriving a transform coefficient and/or a unit for deriving a residual signal from a transform coefficient.

In some cases, a unit may be used interchangeably with a term such as a block or an area, etc. In a general case, a M×N block may represent a set of transform coefficients or samples consisting of M columns and N rows. A sample may generally represent a pixel or a pixel value, and may represent only a pixel/a pixel value of a luma component, or only a pixel/a pixel value of a chroma component. A sample may be used as a term that makes one picture (or image) correspond to a pixel or a pel.

An encoding device 200 may subtract a prediction signal (a prediction block, a prediction sample array) output from an inter predictor 221 or an intra predictor 222 from an input image signal (an original block, an original sample array) to generate a residual signal (a residual signal, a residual sample array), and a generated residual signal is transmitted to a transformer 232. In this case, a unit that subtracts a prediction signal (a prediction block, a prediction sample array) from an input image signal (an original block, an original sample array) within an encoding device 200 may be referred to as a subtractor 231.

A predictor 220 may perform prediction on a block to be processed (hereinafter, referred to as a current block) and generate a predicted block including prediction samples for the current block. A predictor 220 may determine whether intra prediction or inter prediction is applied in a unit of a current block or a CU. A predictor 220 may generate various information on prediction such as prediction mode information, etc. and transmit it to an entropy encoder 240 as described later in a description of each prediction mode. Information on prediction may be encoded in an entropy encoder 240 and output in a form of a bitstream.

An intra predictor 222 may predict a current block by referring to samples within a current picture. The samples referred to may be positioned in the neighborhood of the current block or may be positioned a certain distance away from the current block according to a prediction mode. In intra prediction, prediction modes may include at least one nondirectional mode and a plurality of directional modes. A nondirectional mode may include at least one of a DC mode or a planar mode. A directional mode may include 33 directional modes or 65 directional modes according to a detail level of a prediction direction. However, it is an example, and more or less directional modes may be used according to a configuration. An intra predictor 222 may determine a prediction mode applied to a current block by using a prediction mode applied to a neighboring block.

An inter predictor 221 may derive a prediction block for a current block based on a reference block (a reference sample array) specified by a motion vector on a reference picture. In this case, in order to reduce the amount of motion information transmitted in an inter prediction mode, motion information may be predicted in a unit of a block, a sub-block or a sample based on the correlation of motion information between a neighboring block and a current block. The motion information may include a motion vector and a reference picture index. The motion information may further include inter prediction direction information (L0 prediction, L1 prediction, Bi prediction, etc.). For inter prediction, a neighboring block may include a spatial neighboring block existing in a current picture and a temporal neighboring block existing in a reference picture. A reference picture including the reference block and a reference picture including the temporal neighboring block may be the same or different. The temporal neighboring block may be referred to as a collocated reference block, a collocated CU (colCU), etc., and a reference picture including the temporal neighboring block may be referred to as a collocated picture (colPic). For example, an inter predictor 221 may configure a motion information candidate list based on neighboring blocks and generate information indicating which candidate is used to derive a motion vector and/or a reference picture index of the current block. Inter prediction may be performed based on various prediction modes, and for example, for a skip mode and a merge mode, an inter predictor 221 may use motion information of a neighboring block as motion information of a current block. For a skip mode, unlike a merge mode, a residual signal may not be transmitted. For a motion vector prediction (MVP) mode, a motion vector of a surrounding block is used as a motion vector predictor and a motion vector difference is signaled to indicate a motion vector of a current block.

A predictor 220 may generate a prediction signal based on various prediction methods described later. For example, a predictor may not only apply intra prediction or inter prediction for prediction for one block, but also may apply intra prediction and inter prediction simultaneously. It may be referred to as a combined inter and intra prediction (CIIP) mode. In addition, a predictor may be based on an intra block copy (IBC) prediction mode or may be based on a palette mode for prediction for a block. The IBC prediction mode or palette mode may be used for content image/video coding of a game, etc. such as screen content coding (SCC), etc. IBC basically performs prediction within a current picture, but it may be performed similarly to inter prediction in that it derives a reference block within a current picture. In other words, IBC may use at least one of inter prediction techniques described herein. A palette mode may be considered as an example of intra coding or intra prediction. When a palette mode is applied, a sample value within a picture may be signaled based on information on a palette table and a palette index. A prediction signal generated through the predictor 220 may be used to generate a reconstructed signal or a residual signal.

A transformer 232 may generate transform coefficients by applying a transform technique to a residual signal. For example, a transform technique may include at least one of Discrete Cosine Transform (DCT), Discrete Sine Transform (DST), Karhunen-Loève Transform (KLT), Graph-Based Transform (GBT) or Conditionally Non-linear Transform (CNT). Here, GBT refers to transform obtained from this graph when relationship information between pixels is expressed as a graph. CNT refers to transform obtained based on generating a prediction signal by using all previously reconstructed pixels. In addition, a transform process may be applied to a square pixel block in the same size or may be applied to a non-square block in a variable size.

A quantizer 233 may quantize transform coefficients and transmit them to an entropy encoder 240 and an entropy encoder 240 may encode a quantized signal (information on quantized transform coefficients) and output it as a bitstream. Information on the quantized transform coefficients may be referred to as residual information. A quantizer 233 may rearrange quantized transform coefficients in a block form into an one-dimensional vector form based on coefficient scan order, and may generate information on the quantized transform coefficients based on the quantized transform coefficients in the one-dimensional vector form.

An entropy encoder 240 may perform various encoding methods such as exponential Golomb, context-adaptive variable length coding (CAVLC), context-adaptive binary arithmetic coding (CABAC), etc. An entropy encoder 240 may encode information necessary for video/image reconstruction (e.g., a value of syntax elements, etc.) other than quantized transform coefficients together or separately.

Encoded information (ex. encoded video/image information) may be transmitted or stored in a unit of a network abstraction layer (NAL) unit in a bitstream form. The video/image information may further include information on various parameter sets such as an adaptation parameter set (APS), a picture parameter set (PPS), a sequence parameter set (SPS) or a video parameter set (VPS), etc. In addition, the video/image information may further include general constraint information. Herein, information and/or syntax elements transmitted/signaled from an encoding device to a decoding device may be included in video/image information. The video/image information may be encoded through the above-described encoding procedure and included in the bitstream. The bitstream may be transmitted through a network or may be stored in a digital storage medium. Here, a network may include a broadcasting network and/or a communication network, etc. and a digital storage medium may include various storage media such as USB, SD, CD, DVD, Blu-ray, HDD, SSD, etc. A transmission unit (not shown) for transmitting and/or a storage unit (not shown) for storing a signal output from an entropy encoder 240 may be configured as an internal/external element of an encoding device 200, or a transmission unit may be also included in an entropy encoder 240.

Quantized transform coefficients output from a quantizer 233 may be used to generate a prediction signal. For example, a residual signal (a residual block or residual samples) may be reconstructed by applying dequantization and inverse transform to quantized transform coefficients through a dequantizer 234 and an inverse transformer 235. An adder 250 may add a reconstructed residual signal to a prediction signal output from an inter predictor 221 or an intra predictor 222 to generate a reconstructed signal (a reconstructed picture, a reconstructed block, a reconstructed sample array). When there is no residual for a block to be processed like when a skip mode is applied, a predicted block may be used as a reconstructed block. An adder 250 may be referred to as a reconstructor or a reconstructed block generator. A generated reconstructed signal may be used for intra prediction of a next block to be processed within a current picture, and may be also used for inter prediction of a next picture through filtering as described later. Meanwhile, luma mapping with chroma scaling (LMCS) may be applied in a picture encoding and/or reconstruction process.

A filter 260 may improve subjective/objective image quality by applying filtering to a reconstructed signal. For example, a filter 260 may generate a modified reconstructed picture by applying various filtering methods to a reconstructed picture, and may store the modified reconstructed picture in a memory 270, specifically in a DPB of a memory 270. The various filtering methods may include deblocking filtering, sample adaptive offset, adaptive loop filter, bilateral filter, etc. A filter 260 may generate various information on filtering and transmit it to an entropy encoder 240. Information on filtering may be encoded in an entropy encoder 240 and output in a form of a bitstream.

A modified reconstructed picture transmitted to a memory 270 may be used as a reference picture in an inter predictpr 221. When inter prediction is applied through it, an encoding device may avoid prediction mismatch in an encoding device 200 and a decoding device, and may also improve encoding efficiency.

A DPB of a memory 270 may store a modified reconstructed picture to use it as a reference picture in an inter predictor 221. A memory 270 may store motion information of a block from which motion information in a current picture is derived (or encoded) and/or motion information of blocks in a pre-reconstructed picture. The stored motion information may be transmitted to an inter predictor 221 to be used as motion information of a spatial neighboring block or motion information of a temporal neighboring block. A memory 270 may store reconstructed samples of reconstructed blocks in a current picture and transmit them to an intra predictor 222.

Figure 3:
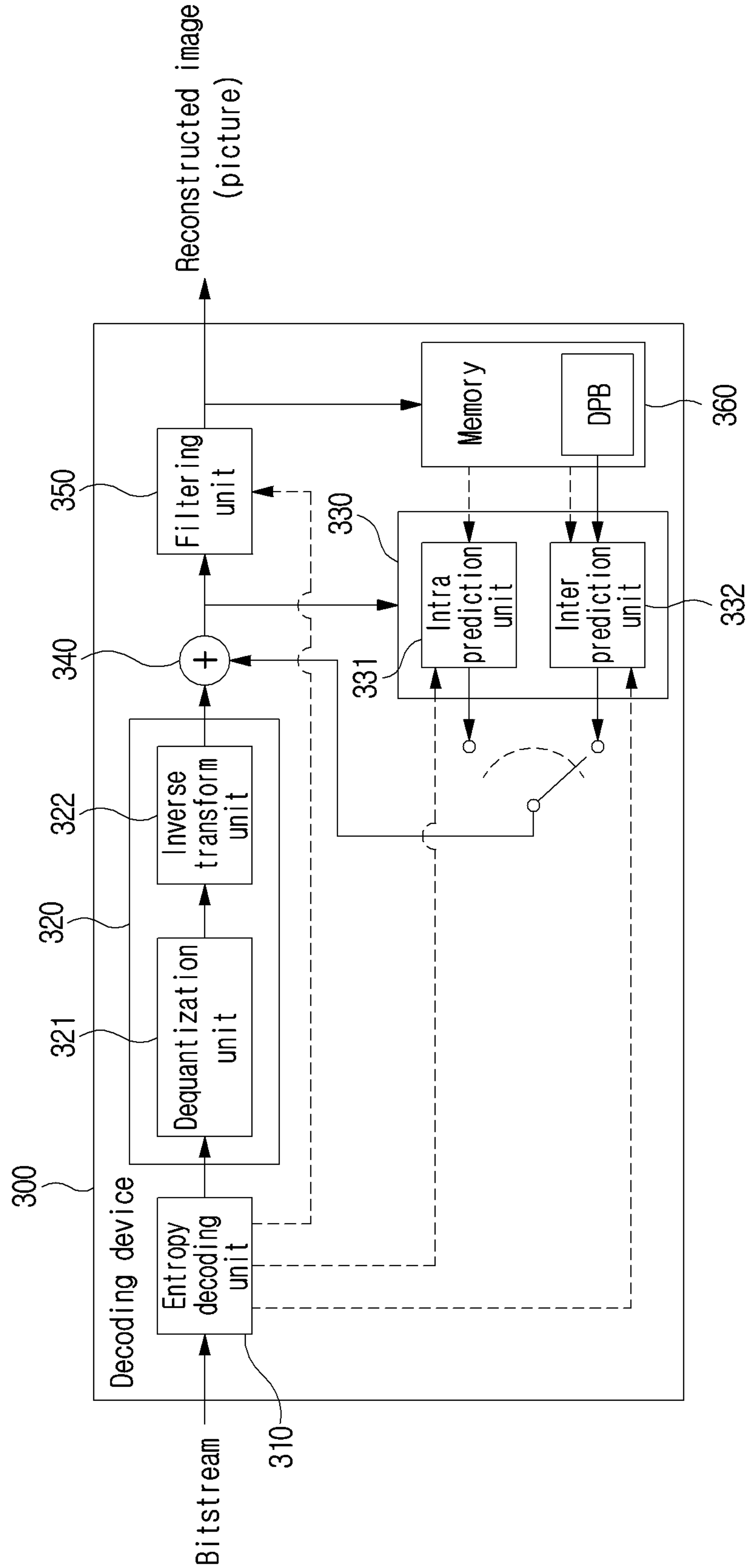
FIG. 3 shows a rough block diagram of a decoding device to which an embodiment of the present disclosure may be applied and decoding of a video/image signal is performed.

FIG. 3 shows a rough block diagram of a decoding device to which an embodiment of the present disclosure may be applied and decoding of a video/image signal is performed.

Referring to FIG. 3, a decoding device 300 may be configured by including an entropy decoder 310, a residual processor 320, a predictor 330, an adder 340, a filter 350 and a memory 360. A predictor 330 may include an inter predictor 332 and an intra predictor 331. A residual processor 320 may include a dequantizer 321 and an inverse transformer 321.

According to an embodiment, the above-described entropy decoder 310, residual processor 320, predictor 330, adder 340 and filter 350 may be configured by one hardware component (e.g., a decoder chipset or a processor). In addition, a memory 360 may include a decoded picture buffer (DPB) and may be configured by a digital storage medium. The hardware component may further include a memory 360 as an internal/external component.

When a bitstream including video/image information is input, a decoding device 300 may reconstruct an image in response to a process in which video/image information is processed in an encoding device of FIG. 2. For example, a decoding device 300 may derive units/blocks based on block partition-related information obtained from the bitstream. A decoding device 300 may perform decoding by using a processing unit applied in an encoding device. Accordingly, a processing unit of decoding may be a coding unit, and a coding unit may be partitioned from a coding tree unit or the larget coding unit according to a quad tree structure, a binary tree structure and/or a ternary tree structure. At least one transform unit may be derived from a coding unit. And, a reconstructed image signal decoded and output through a decoding device 300 may be played through a playback device.

A decoding device 300 may receive a signal output from an encoding device of FIG. 2 in a form of a bitstream, and a received signal may be decoded through an entropy decoder 310. For example, an entropy decoder 310 may parse the bitstream to derive information (ex. video/image information) necessary for image reconstruction (or picture reconstruction). The video/image information may further include information on various parameter sets such as an adaptation parameter set (APS), a picture parameter set (PPS), a sequence parameter set (SPS) or a video parameter set (VPS), etc. In addition, the video/image information may further include general constraint information. A decoding device may decode a picture further based on information on the parameter set and/or the general constraint information. Signaled/received information and/or syntax elements described later herein may be decoded through the decoding procedure and obtained from the bitstream. For example, an entropy decoder 310 may decode information in a bitstream based on a coding method such as exponential Golomb encoding, CAVLC, CABAC, etc. and output a value of a syntax element necessary for image reconstruction and quantized values of a transform coefficient regarding a residual. In more detail, a CABAC entropy decoding method may receive a bin corresponding to each syntax element from a bitstream, determine a context model by using syntax element information to be decoded, decoding information of a surrounding block and a block to be decoded or information of a symbol/a bin decoded in a previous step, perform arithmetic decoding of a bin by predicting a probability of occurrence of a bin according to a determined context model and generate a symbol corresponding to a value of each syntax element. In this case, a CABAC entropy decoding method may update a context model by using information on a decoded symbol/bin for a context model of a next symbol/bin after determining a context model. Among information decoded in an entropy decoder 310, information on prediction is provided to a predictor (an inter predictor 332 and an intra predictor 331), and a residual value on which entropy decoding was performed in an entropy decoder 310, i.e., quantized transform coefficients and related parameter information may be input to a residual processor 320. A residual processor 320 may derive a residual signal (a residual block, residual samples, a residual sample array). In addition, information on filtering among information decoded in an entropy decoder 310 may be provided to a filter 350. Meanwhile, a reception unit (not shown) that receives a signal output from an encoding device may be further configured as an internal/external element of a decoding device 300 or a reception unit may be a component of an entropy decoder 310.

Meanwhile, a decoding device according to this specification may be referred to as a video/image/picture decoding device, and the decoding device may be divided into an information decoder (a video/image/picture information decoder) and a sample decoder (a video/image/picture sample decoder). The information decoder may include the entropy decoder 310 and the sample decoder may include at least one of dequantizer 321, the inverse transformer 322, the adder 340, the filter 350, the memory 360, the inter predictor 332 and the intra predictor 331.

A dequantizer 321 may dequantize quantized transform coefficients and output transform coefficients. A dequantizer 321 may rearrange quantized transform coefficients into a two-dimensional block form. In this case, the rearrangement may be performed based on coefficient scan order performed in an encoding device. A dequantizer 321 may perform dequantization on quantized transform coefficients by using a quantization parameter (e.g., quantization step size information) and obtain transform coefficients.

An inverse transformer 322 inversely transforms transform coefficients to obtain a residual signal (a residual block, a residual sample array).

A predictor 320 may perform prediction on a current block and generate a predicted block including prediction samples for the current block. A predictor 320 may determine whether intra prediction or inter prediction is applied to the current block based on the information on prediction output from an entropy decoder 310 and determine a specific intra/inter prediction mode.

A predictor 320 may generate a prediction signal based on various prediction methods described later. For example, a predictor 320 may not only apply intra prediction or inter prediction for prediction for one block, but also may apply intra prediction and inter prediction simultaneously. It may be referred to as a combined inter and intra prediction (CIIP) mode. In addition, a predictor may be based on an intra block copy (IBC) prediction mode or may be based on a palette mode for prediction for a block. The IBC prediction mode or palette mode may be used for content image/video coding of a game, etc. such as screen content coding (SCC), etc. IBC basically performs prediction within a current picture, but it may be performed similarly to inter prediction in that it derives a reference block within a current picture. In other words, IBC may use at least one of inter prediction techniques described herein. A palette mode may be considered as an example of intra coding or intra prediction. When a palette mode is applied, information on a palette table and a palette index may be included in the video/image information and signaled.

An intra predictor 331 may predict a current block by referring to samples within a current picture. The samples referred to may be positioned in the neighborhood of the current block or may be positioned a certain distance away from the current block according to a prediction mode. In intra prediction, prediction modes may include at least one nondirectional mode and a plurality of directional modes. An intra predictor 331 may determine a prediction mode applied to a current block by using a prediction mode applied to a neighboring block.

An inter predictor 332 may derive a prediction block for a current block based on a reference block (a reference sample array) specified by a motion vector on a reference picture. In this case, in order to reduce the amount of motion information transmitted in an inter prediction mode, motion information may be predicted in a unit of a block, a sub-block or a sample based on the correlation of motion information between a neighboring block and a current block. The motion information may include a motion vector and a reference picture index. The motion information may further include inter prediction direction information (L0 prediction, L1 prediction, Bi prediction, etc.). For inter prediction, a neighboring block may include a spatial neighboring block existing in a current picture and a temporal neighboring block existing in a reference picture. For example, an inter predictor 332 may configure a motion information candidate list based on neighboring blocks and derive a motion vector and/or a reference picture index of the current block based on received candidate selection information. Inter prediction may be performed based on various prediction modes, and the information on prediction may include information indicating an inter prediction mode for the current block.

An adder 340 may add an obtained residual signal to a prediction signal (a prediction block, a prediction sample array) output from a predictor (including an inter predictor 332 and/or an intra predictor 331) to generate a reconstructed signal (a reconstructed picture, a reconstructed block, a reconstructed sample array). When there is no residual for a block to be processed like when a skip mode is applied, a prediction block may be used as a reconstructed block.

An adder 340 may be referred to as a reconstructor or a reconstructed block generator. A generated reconstructed signal may be used for intra prediction of a next block to be processed in a current picture, may be output through filtering as described later or may be used for inter prediction of a next picture. Meanwhile, luma mapping with chroma scaling (LMCS) may be applied in a picture decoding process.

A filter 350 may improve subjective/objective image quality by applying filtering to a reconstructed signal. For example, a filter 350 may generate a modified reconstructed picture by applying various filtering methods to a reconstructed picture and transmit the modified reconstructed picture to a memory 360, specifically a DPB of a memory 360. The various filtering methods may include deblocking filtering, sample adaptive offset, adaptive loop filter, bilateral filter, etc.

The (modified) reconstructed picture stored in the DPB of the memory 360 can be used as a reference picture in the inter prediction unit 332. A memory 360 may store motion information of a block from which motion information in a current picture is derived (or decoded) and/or motion information of blocks in a pre-reconstructed picture. The stored motion information may be transmitted to an inter predictor 332 to be used as motion information of a spatial neighboring block or motion information of a temporal neighboring block. A memory 360 may store reconstructed samples of reconstructed blocks in a current picture and transmit them to an intra predictor 331.

Herein, embodiments described in a filter 260, an inter predictor 221 and an intra predictor 222 of an encoding device 200 may be also applied equally or correspondingly to a filter 350, an inter predictor 332 and an intra predictor 331 of a decoding device 300, respectively.

Meanwhile, when inter prediction is applied, a predictor of an encoding device/a decoding device may perform inter prediction in a unit of a block to derive a prediction sample. Inter prediction may represent prediction derived in a manner dependent on data elements (ex. sample values or motion information) of picture(s) other than a current picture. When inter prediction is applied to a current block, a predicted block (a prediction sample array) for a current block may be derived based on a reference block (a reference sample array) specified by a motion vector on a reference picture indicated by a reference picture index.

In this case, in order to reduce the amount of motion information transmitted in an inter prediction mode, the motion information of a current block may be predicted in a unit of a block, a sub-block or a sample based on a correlation of motion information between a neighboring block and a current block. The motion information may include a motion vector and/or a reference picture index. The motion information may further include information on an inter prediction type (L0 prediction, L1 prediction, Bi prediction, etc.). When inter prediction is applied, a neighboring block may include a spatial neighboring block existing in a current picture and a temporal neighboring block existing in a reference picture.

A reference picture including the reference block may be the same as or different from a reference picture including the temporal neighboring block. The temporal neighboring block may be called a collocated reference block, a collocated CU (colCU), etc., and a reference picture including the temporal neighboring block may be called a collocated picture (colPic). For example, a motion information candidate list may be configured based on neighboring blocks of a current block, and flag or index information indicating which candidate is selected (used) to derive a motion vector and/or a reference picture index of the current block may be signaled.

Inter prediction may be performed based on various prediction modes, and for example, for a skip mode and a merge mode, the motion information of a current block may be the same as the motion information of a selected neighboring block. For a skip mode, unlike a merge mode, a residual signal may not be transmitted. For a motion vector prediction (MVP) mode, a motion vector of a selected neighboring block may be used as a motion vector predictor and a motion vector difference may be signaled. In this case, a motion vector of the current block may be derived by using the sum of the motion vector predictor and the motion vector difference.

The motion information may include L0 motion information and/or L1 motion information according to an inter prediction type (L0 prediction, L1 prediction, Bi prediction, etc.). A motion vector in a L0 direction may be called a L0 motion vector or MVL0 and a motion vector in a L1 direction may be called a L1 motion vector or MVL1. Prediction based on a L0 motion vector may be called L0 prediction, prediction based on a L1 motion vector may be called L1 prediction and prediction based on both the L0 motion vector and the L1 motion vector may be called Bi prediction. Here, a L0 motion vector may represent a motion vector associated with reference picture list L0 (L0) and a L1 motion vector may represent a motion vector associated with reference picture list L1 (L1). Reference picture list L0 may include pictures before the current picture in output order as reference pictures and reference picture list L1 may include pictures after the current picture in output order. The previous pictures may be called a forward (reference) picture and the subsequent pictures may be called a backward (reference) picture.

The reference picture list L0 may further include pictures after the current picture in output order as reference pictures. In this case, the previous pictures may be indexed first and the subsequent pictures may be indexed next within the reference picture list L0. The reference picture list L1 may further include pictures before the current picture in output order as reference pictures. In this case, the subsequent pictures may be indexed first and the previous pictures may be indexed next within the reference picture list1. Here, output order may correspond to picture order count (POC) order.

A video/image encoding procedure based on inter prediction may roughly include, for example, the following.

Figure 4:
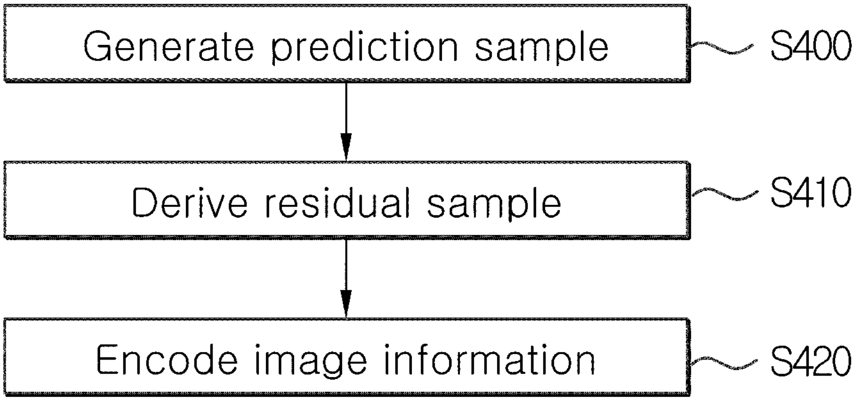
FIG. 4 shows an example of an inter prediction-based video/image encoding method to which an embodiment of the present disclosure may be applied.

FIG. 4 shows an example of an inter prediction-based video/image encoding method to which an embodiment of the present disclosure may be applied.

An encoding device may perform inter prediction for a current block S400. An encoding device may derive an inter prediction mode and motion information of a current block and generate prediction samples of the current block. Here, procedures of determining an inter prediction mode, deriving motion information and generating prediction samples may be performed simultaneously or any one procedure may be performed before other procedures. For example, an inter predictor of an encoding device may include a prediction mode determination unit, a motion information derivation unit and a prediction sample derivation unit, a prediction mode determination unit may determine a prediction mode for the current block, a motion information derivation unit may derive motion information of the current block and a prediction sample derivation unit may derive prediction samples of the current block.

For example, an inter predictor of an encoding device may search a block similar to the current block within a certain region (a search region) of reference pictures through motion estimation and derive a reference block whose difference from the current block is minimal or less than or equal to a certain standard. Based on this, a reference picture index indicating a reference picture where the reference block is positioned may be derived and a motion vector may be derived based on a position difference between the reference block and the current block.

An encoding device may determine a mode applied to the current block among various prediction modes. An encoding device may compare a RD cost for the various prediction modes and determine an optimal prediction mode for the current block.

For example, when a skip mode or a merge mode is applied to the current block, an encoding device may configure a merge candidate list described below and derive a reference block whose difference from the current block is minimal or less than or equal to a certain standard among the reference blocks indicated by merge candidates included in the merge candidate list. In this case, a merge candidate associated with the derived reference block may be selected and merge index information indicating the selected merge candidate may be generated and signaled to a decoding device. The motion information of the current block may be derived by using the motion information of the selected merge candidate.

As another example, when an (A) MVP mode is applied to the current block, an encoding device may configure an (A) MVP candidate list described below and use a motion vector of a motion vector predictor (mvp) candidate selected from the motion vector predictor candidates included in the (A) MVP candidate list as a motion vector predictor of the current block. In this case, for example, a motion vector indicating a reference block derived by motion estimation described above may be used as a motion vector of the current block and a motion vector predictor candidate having a motion vector with the smallest difference from a motion vector of the current block among the motion vector predictor candidates may become the selected motion vector predictor candidate. A motion vector difference (MVD) which is a difference obtained by subtracting the motion vector predictor from a motion vector of the current block may be derived. In this case, information on the MVD may be signaled to a decoding device. In addition, when an (A) MVP mode is applied, a value of the reference picture index may be configured as reference picture index information and signaled separately to the decoding device.

An encoding device may derive residual samples based on the prediction samples S410. An encoding device may derive the residual samples by comparing original samples of the current block with the prediction samples.

An encoding device may encode image information including prediction information and residual information S420. An encoding device may output encoded image information in a form of a bitstream. The prediction information is information related to the prediction procedure, and may include prediction mode information (ex. a skip flag, a merge flag or a merge index, etc.) and/or motion information. The motion information may include candidate selection information (ex. a merge index, a mvp flag or a mvp index) which is information for deriving a motion vector. In addition, the motion information may include information on the above-described MVD and/or reference picture index information. In addition, the motion information may include information representing whether L0 prediction, L1 prediction or bi-prediction is applied. The residual information is information on the residual samples. The residual information may include information on quantized transform coefficients for the residual samples.

An output bitstream may be stored in a (digital) storage medium and transmitted to a decoding device, or may be transmitted to a decoding device through a network.

Meanwhile, as described above, an encoding device may generate a reconstructed picture (including reconstructed samples and reconstructed blocks) based on the reference samples and the residual samples. It is to derive the same prediction result as performed in a decoding device in an encoding device, through which it may improve coding efficiency. Accordingly, an encoding device may store a reconstructed picture (or reconstructed samples, reconstructed blocks) in a memory and utilize it as a reference picture for inter prediction. As described above, an in-loop filtering procedure, etc. may be further applied to the reconstructed picture.

A video/image decoding procedure based on inter prediction may roughly include, for example, the following.

Figure 5:
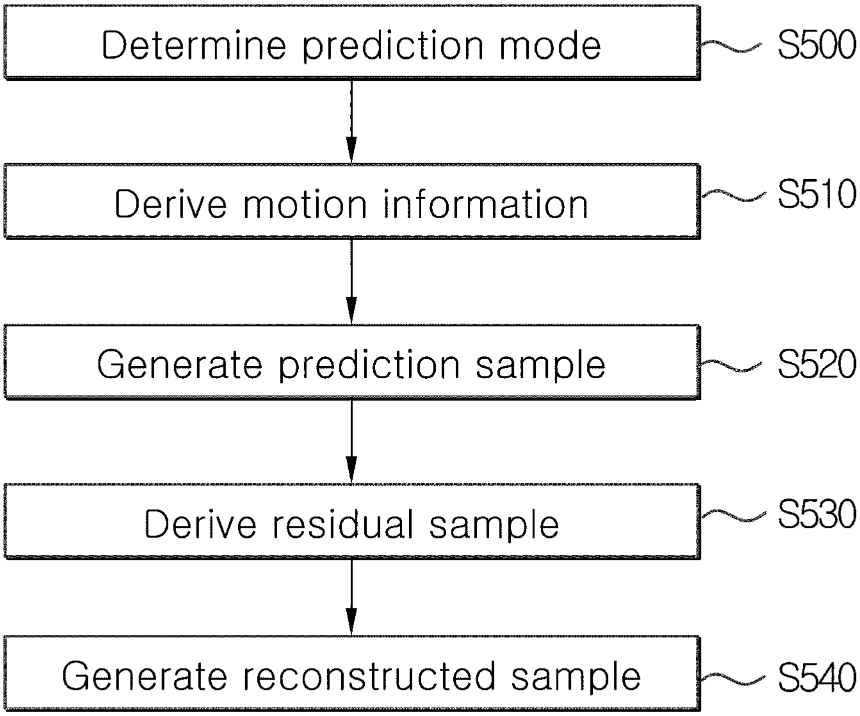
FIG. 5 shows an example of an inter prediction-based video/image decoding method to which an embodiment of the present disclosure may be applied.

FIG. 5 shows an example of an inter prediction-based video/image decoding method to which an embodiment of the present disclosure may be applied.

Referring to FIG. 5, a decoding device may perform an operation corresponding to an operation performed in the encoding device. A decoding device may perform prediction on a current block based on received prediction information and derive prediction samples.

Specifically, a decoding device may determine a prediction mode for the current block based on received prediction information S500. A decoding device may determine which inter prediction mode is applied to the current block based on prediction mode information in the prediction information.

For example, whether the merge mode is applied to the current block or whether an (A) MVP mode is determined may be determined based on a merge flag. Alternatively, one of various inter prediction mode candidates may be selected based on a mode index. The inter prediction mode candidates may include a skip mode, a merge mode and/or an (A) MVP mode or may include various inter prediction modes described below.

A decoding device may derive motion information of the current block based on the determined inter prediction mode S510. For example, when a skip mode or a merge mode is applied to the current block, a decoding device may configure a merge candidate list described below and select one of the merge candidates included in the merge candidate list. The selection may be performed based on selection information (a merge index) described above. The motion information of the current block may be derived by using the motion information of the selected merge candidate. The motion information of the selected merge candidate may be used as the motion information of the current block.

As another example, when an (A) MVP mode is applied to the current block, a decoding device may configure an (A) MVP candidate list described below and use a motion vector of a mvp candidate selected among the motion vector predictor (mvp) candidates included in the (A) MVP candidate list as a mvp of the current block. The selection may be performed based on selection information (mvp flag or mvp index) described above. In this case, a MVD of the current block may be derived based on information on the MVD and a motion vector of the current block may be derived based on a mvp of the current block and the MVD. In addition, a reference picture index of the current block may be derived based on the reference picture index information. A picture indicated by the reference picture index in a reference picture list for the current block may be derived as a reference picture referred to for inter prediction of the current block.

Meanwhile, as described below, the motion information of the current block may be derived without configuring a candidate list and in this case, the motion information of the current block may be derived according to a procedure initiated in a prediction mode described below. In this case, a candidate list configuration as described above may be omitted.

A decoding device may generate prediction samples for the current block based on the motion information of the current block S520. In this case, the reference picture may be derived based on a reference picture index of the current block and prediction samples of the current block may be derived by using samples of a reference block indicated by a motion vector of the current block on the reference picture. In this case, as described below, in some cases, a prediction sample filtering procedure for all or part of the prediction samples of the current block may be further performed.

For example, an inter predictor of a decoding device may include a prediction mode determination unit, a motion information derivation unit and a prediction sample derivation unit, a prediction mode determination unit may determine a prediction mode for the current block based on received prediction mode information, a motion information derivation unit may derive the motion information (a motion vector and/or a reference picture index, etc.) of the current block based on information on received motion information and a prediction sample derivation unit may derive prediction samples of the current block.

A decoding device generates residual samples for the current block based on received residual information S530. A decoding device may generate reconstructed samples for the current block based on the prediction samples and the residual samples and generate a reconstructed picture based on this S540. As described above, afterwards, an in-loop filtering procedure, etc. may be further applied to the reconstructed picture.

Figure 6:
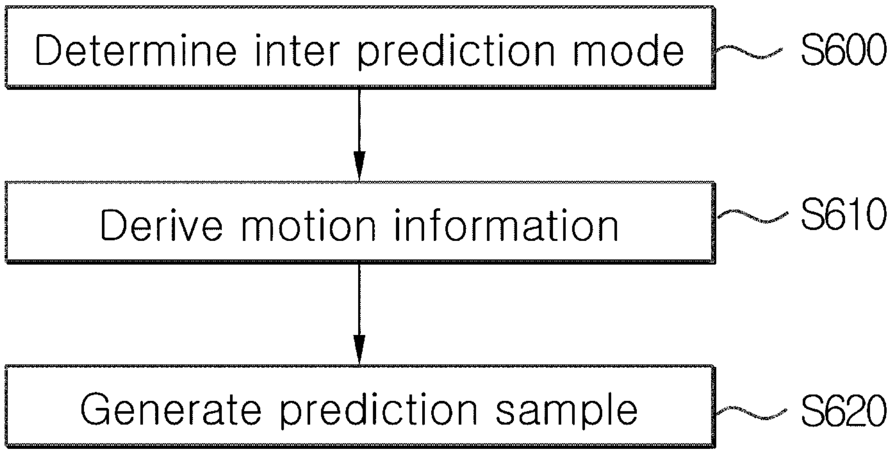
FIG. 6 illustratively shows an inter prediction procedure to which an embodiment of the present disclosure may be applied.

FIG. 6 illustratively shows an inter prediction procedure to which an embodiment of the present disclosure may be applied.

Referring to FIG. 6, as described above, an inter prediction procedure may include determining an inter prediction mode, deriving motion information according to a determined prediction mode and performing prediction (generating a prediction sample) based on derived motion information. The inter prediction procedure may be performed in an encoding device and a decoding device as described above. In this document, a coding device may include an encoding device and/or a decoding device.

Referring to FIG. 6, a coding device determines an inter prediction mode for a current block S600. A variety of inter prediction modes may be used for prediction of a current block in a picture. For example, various modes such as a merge mode, a skip mode, a motion vector prediction (MVP) mode, an affine mode, a sub-block merge mode, a merge with MVD (MMVD) mode, etc. may be used. A decoder side motion vector refinement (DMVR) mode, an adaptive motion vector resolution (AMVR) mode, a Bi-prediction with CU-level weight (BCW), a Bi-directional optical flow (BDOF), etc. may be used as an incidental mode additionally or alternatively. In addition, according to an embodiment of the present disclosure, the above-described inter prediction mode may include a Multi-Hypethesis Prediction (MHP) mode. A multi-Hypothesis prediction mode represents a method for performing prediction by weighted summing a prediction block generated based on additional motion information for a bidirectional prediction (or bi-prediction) block. A multi-hypothesis prediction mode is described in detail later.

In the present disclosure, an affine mode may be referred to as an affine motion prediction mode. In addition, a MVP mode may be referred to as an advanced motion vector prediction (AMVP) mode. In the present disclosure, some modes and/or a motion information candidate derived by some modes may be included as one of the motion information-related candidates of another mode. For example, a HMVP candidate may be added as a merge candidate of the merge/skip mode or may be added as a motion vector predictor candidate of the AMVP mode. When the HMVP candidate is used as a motion information candidate of the merge mode or the skip mode, the HMVP candidate may be referred to as a HMVP merge candidate.

Prediction mode information indicating an inter prediction mode of a current block may be signaled from an encoding device to a decoding device. The prediction mode information may be included in a bitstream and received in a decoding device. The prediction mode information may include index information indicating one of multiple candidate modes. Alternatively, an inter prediction mode may be indicated through hierarchical signaling of flag information.

In this case, the prediction mode information may include at least one flag. For example, a skip flag may be signaled to indicate whether to apply a skip mode, a merge flag may be signaled to indicate whether to apply a merge mode when a skip mode is not applied, and a flag to indicate that a MVP mode is applied or for an additional division may be further signaled when a merge mode is not applied. An affine mode may be signaled as an independent mode or may be signaled as a mode dependent on a merge mode or a MVP mode, etc. For example, an affine mode may include an affine merge mode and an affine MVP mode.

A coding device may derive motion information for the current block S610. The motion information may be derived based on the inter prediction mode. A coding device may perform inter prediction by using the motion information of a current block. An encoding device may derive optimal motion information for a current block through a motion estimation procedure.

For example, an encoding device may use an original block within an original picture for a current block to search a similar reference block with a high correlation in a fractional pixel unit in a determined search range within a reference picture and derive motion information through it. The similarity of a block may be derived based on a difference between phase-based sample values. For example, the similarity of a block may be calculated based on a SAD between a current block (or a template of a current block) and a reference block (or a template of a reference block). In this case, motion information may be derived based on a reference block with the smallest SAD within a search range. Derived motion information may be signaled to a decoding device according to various methods based on an inter prediction mode.

A coding device may perform inter prediction based on motion information for the current block S620. A coding device may generate prediction sample(s) for the current block based on the motion information. A current block including the prediction samples may be called a predicted block.

Hereinafter, a multi-hypothesis prediction mode is described in detail. As described above, a multi-hypothesis prediction mode represents a prediction method that considers an additional prediction block (or a predictor) to a bidirectional prediction block. A multi-hypothesis prediction mode may be selectively used as one of a variety of inter prediction modes described above. Of course, a multi-hypothesis prediction mode according to an embodiment of the present disclosure is not limited to this name. In the present disclosure, a multi-hypothesis prediction mode may also be referred to as a MHP mode, a multi-hypothesis inter prediction mode, an inter-inter combined prediction mode, a combined inter prediction mode, a combined prediction mode, a multi-inter prediction mode, a multi-prediction mode, etc.

Figure 7:
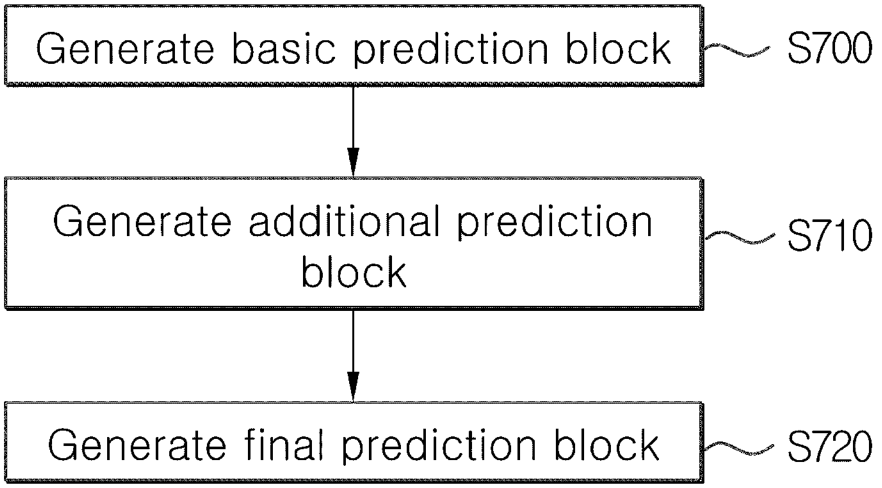
FIG. 7 shows an inter prediction method performed by a decoding device 300 according to an embodiment of the present disclosure.

FIG. 7 shows an inter prediction method performed by a decoding device 300 according to an embodiment of the present disclosure.

Referring to FIG. 7, a decoding device may perform bidirectional prediction to generate a basic prediction block S700. When a MHP mode is applied, a decoding device may generate and combine an additional prediction block other than a prediction block generated (or derived) by bidirectional prediction. As an example, a basic prediction block may include a L0 prediction block and/or a L1 prediction block. In the present disclosure, a basic prediction block may be referred to as an initial prediction block, a temporary prediction block, a reference prediction block, etc. In addition, as an example, a basic prediction block may be a prediction block obtained by weighted summing L0 and L1 prediction blocks.

In an embodiment, a weight may be used for the weighted sum of L0 and L1 prediction blocks. As a weight used for weighted prediction, a weight may be collectively referred to as Bi-prediction with CU based Weights (BCW) or CU based Weights (CW). A weight may be derived from a weight candidate list. A weight candidate list may include a plurality of weight candidates and may be predefined in an encoding/decoding device.

A weight candidate may be a set of weights (i.e., a first weight and a second weight) representing weights applied to each bidirectional prediction block or may be a weight applied to a prediction block in any one of both directions. When only a weight applied to a prediction block in any one direction is derived from a weight candidate list, a weight applied to a prediction block in the other direction may be derived based on a weight derived from a weight candidate list. For example, a weight applied to a prediction block in the other direction may be derived by subtracting a weight derived from a weight candidate list from a predetermined value.

In an embodiment, a weight index indicating a weight used for weighted prediction of a current block may be derived in a weight candidate list. In the present disclosure, a weight index may be referred to as bcw_idx, a bcw index. A weight index may be derived by a decoding device or may be signaled from an encoding device. When derived by a decoding device, a weight index may be derived as a weight index of a specific merge candidate in a merge candidate list. As an example, a specific merge candidate may be specified by a merge index in a merge candidate list.

A decoding device may generate an additional prediction block based on a MHP mode S710. A decoding device may generate an additional prediction block other than a basic prediction block and combine (or weighted sum) a basic prediction block and a generated additional prediction block.

As an embodiment, when a MHP mode is applied, a decoding device may generate and combine up to a predefined number of additional prediction blocks. In other words, a decoding device may combine (or weighted sum) additional prediction blocks less than or equal to a predefined number to a basic prediction block. As an example, the predefined number may be 2. Alternatively, as an example, the predefined number may be one of 1, 2, 3 and 4. The predefined number may be referred to as the maximum number of MHP.

In addition, when a plurality of additional prediction blocks are combined, a plurality of additional prediction blocks may be sequentially weighted summed to a basic prediction block. For example, when up to 2 additional prediction blocks are generated, a basic prediction block and a first additional prediction block may be weighted summed to generate a prediction block and the generated prediction block and a second additional prediction block may be weighted summed to generate a final prediction block. A prediction block generated by weighted summing a basic prediction block and a first additional prediction block may be referred to as an intermediate prediction block.

Alternatively, when a plurality of additional prediction blocks are combined, a basic prediction block and a plurality of generated additional prediction blocks may be weighted summed in a lump. In other words, after a plurality of additional prediction blocks are generated, a weight may be applied to each of a plurality of additional prediction blocks and a basic prediction block (or a L0 prediction block and a L1 prediction block) and weighted summed in a lump.

In addition, as an embodiment, a decoding device may determine whether to apply MHP. In this case, a step of determining whether to apply MHP may be added before S710. As an example, whether to apply MHP may be explicitly signaled or may be implicitly derived by a decoding device.

In addition, as an embodiment, whether to apply MHP may be signaled from an encoding device to a decoding device. For example, a MHP flag indicating whether to apply MHP may be signaled from an encoding device to a decoding device. In this case, a condition for signaling/parsing a MHP flag may be defined in advance. A signaling/parsing condition of the MHP flag may be an availability condition of MHP. When the signaling/parsing condition is satisfied, a decoding device may parse a MHP flag from a bitstream. Alternatively, as an embodiment, whether to apply MHP may be derived by a decoding device based on predefined encoding information. As an example, whether to apply MHP may be defined in the same manner as a MHP availability condition (or a signaling/parsing condition) described below.

In addition, as an embodiment, a decoding device may obtain MHP information (or may be referred to as MHP prediction information) to generate an additional prediction block. As an example, MHP information may include weight information and/or prediction information. A reference block according to a MHP mode, i.e., an additional prediction block, may be derived based on the prediction information and an additional prediction block derived based on the weight information may be weighted summed with a basic prediction block (or an intermediate prediction block). In addition, as an example, MHP information may further include a MHP flag indicating whether to apply MHP.

As an example, the prediction information may include mode information used to derive an additional prediction block and motion information according to a mode. Mode information may be inter prediction mode information indicating whether it is a merge mode or an AMVP mode. For example, the mode information may be a merge flag. In other words, a merge mode or an AMVP mode may be used to derive an additional prediction block and a flag syntax element for indicating it may be signaled. Alternatively, a predefined mode among a merge mode or an AMVP mode may be used to derive an additional prediction block. Alternatively, a merge mode or an AMVP mode may be selected based on predefined encoding information.

As an example, when a merge mode is used to derive an additional prediction block, the prediction information may include a merge index. A merge index may specify a merge candidate in a merge candidate list. When an AMVP mode is used to derive an additional prediction block, the prediction information may include a motion vector predictor flag, a reference index and motion vector difference information. A motion vector predictor flag may specify a candidate in a motion vector predictor candidate list.

A decoding device may generate a final prediction block by weighted summing a basic prediction block and an additional prediction block S720. As described above, the number of additional prediction blocks may be less than or equal to a predefined number. For example, when the number of additional prediction blocks is 2, a final prediction block may be a block in which a basic prediction block and two additional prediction blocks are weighted summed.

As described above, when a plurality of additional prediction blocks are combined, a plurality of additional prediction blocks may be sequentially weighted summed to a basic prediction block, or a basic prediction block and a plurality of generated additional prediction blocks may be weighted summed in a lump.

Figure 8:
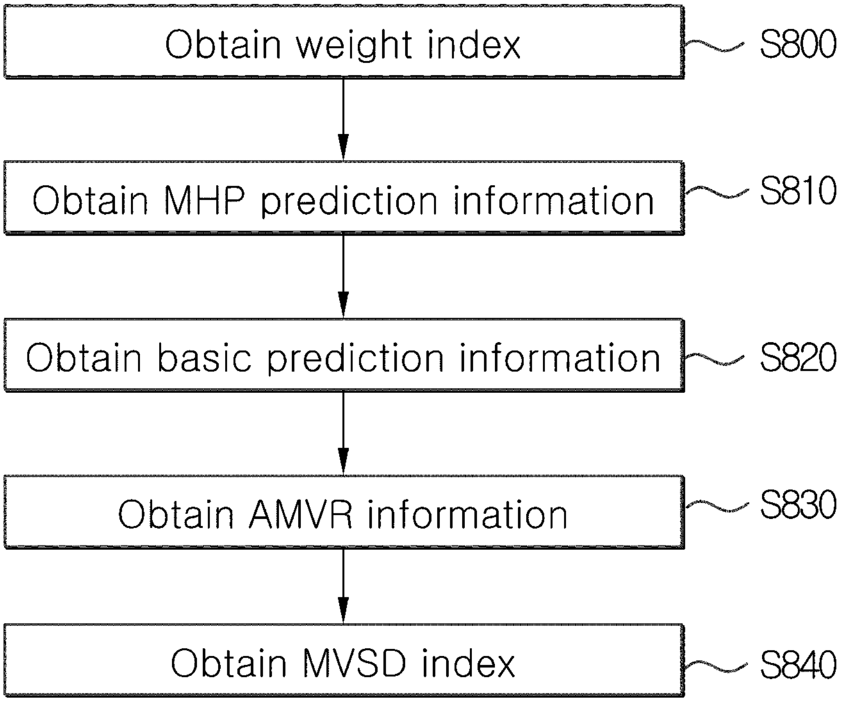
FIG. 8 is a flowchart showing an example of syntax parsing order according to an embodiment of the present disclosure.

FIG. 8 is a flowchart showing an example of syntax parsing order according to an embodiment of the present disclosure.

Referring to FIG. 8, a decoding device may obtain (or parse) a weight index S800. As information (or a syntax element) showing weight information used for a weighted sum of a bidirectional prediction block, a weight index may be a bcw index, bcw_idx. A decoding device may generate a basic prediction block by weighted summing L0 and L1 reference blocks based on a weight index. A weight index may be the same as described above in FIG. 7, and a related overlapping description is omitted.

A decoding device may obtain MHP information S810. A decoding device may generate an additional prediction block based on obtained MHP information. MHP information may be the same as described above in FIG. 7, and a related overlapping description is omitted.

A decoding device may obtain basic prediction information S820. A decoding device may generate a basic prediction block based on obtained basic prediction information. A decoding device may specify L0 and L1 reference blocks based on obtained basic prediction information, and may generate a basic prediction block by weighted summing L0 and L1 reference blocks based on a weight index. Basic prediction information may include a motion vector predictor flag, a reference index and motion vector difference information. Basic prediction information may be the same as described above in FIGS. 4 to 7, and a related overlapping description is omitted.

A decoding device may obtain Adaptive Motion Vector Resolution (AMVR) information S830. In the present disclosure, AMVR may also be referred to as an integer motion vector (IMV). A motion vector derived based on prediction information obtained in S820 may be transformed through a shift operation based on a predetermined variable for adaptive motion vector resolution (hereinafter, referred to as AmvrShift). A motion vector may be derived based on the sum of the transformed motion vector and a motion vector difference.

The variable AmvrShift may be determined based on at least one of a flag regarding adaptive motion vector resolution (hereinafter, referred to as an AMVR flag) or an index regarding adaptive motion vector resolution (hereinafter, referred to as an AMVR index). The AMVR information may include an AMVR flag and/or an AMVR index. Here, the AMVR flag may indicate whether adaptive motion vector resolution is applied to a current block. Alternatively, the AMVR flag may be defined as indicating whether a motion vector difference of a current block has pre-defined default resolution (e.g., a ¼ sample unit). The AMVR index may indicate any one of a plurality of motion vector resolution candidates that are pre-defined equally in an encoding device and a decoding device. The plurality of motion vector resolution candidates may include at least two of a 1/16 sample unit, a ⅛ sample unit, a ¼ sample unit, a ½ sample unit, a 1-sample unit or a 4-sample unit. The maximum number of motion vector resolution candidates that may be used by the current block may be 3, 4, 5 or 6. The AMVR flag and the AMVR index may be acquired for a first direction.

As an example, the variable AmvrShift may be determined as in Table 1 below.

TABLE 1

| amvr_flag | amvr_precision_idx | AmvrShift |
|---|---|---|
| 0 | — | 2 (¼ Sample Unit) |
| 1 | 0 | 3 (½ Sample Unit) |
| 1 | 1 | 4 (1 Sample Unit) |
| 1 | 2 | 6 (4 Sample Unit) |

In Table 1, amvr_flag corresponds to a flag regarding adaptive motion vector resolution described above, and may refer to whether adaptive motion vector resolution is applied to a current block. amvr_precision_idx corresponds to an index regarding adaptive motion vector resolution described above, and may indicate any one of a plurality of pre-defined motion vector resolution candidates.

According to Table 1, when amvr_flag is 0, adaptive motion vector resolution is not applied to a current block and variable AmvrShift is determined as 2. It may mean that a calibrated first motion vector and a motion vector difference of a current block are transformed to have default resolution (i.e., resolution in a ¼ sample unit).

Meanwhile, when amvr_flag is 1, adaptive motion vector resolution may be applied to a current block. In this case, variable AmvrShift may be determined as 3, 4 or 6 based on amvr_precision_idx.

In other words, when amvr_precision_idx is 0, variable AmvrShift may be determined as 3 and a calibrated first motion vector and a motion vector difference of a current block may be transformed to have resolution in a ½ sample unit. A calibrated first motion vector and a motion vector difference of a current block may be bit-shifted by 3 to the left, acquiring a first motion vector and a motion vector difference with resolution in a ½ sample unit, respectively. Similarly, when amvr_precision_idx is 1, variable AmvrShift may be determined as 4 and a calibrated first motion vector and a motion vector difference of a current block may be transformed to have resolution in a 1-sample unit. A calibrated first motion vector and a motion vector difference of a current block may be bit-shifted by 4 to the left, acquiring a first motion vector and a motion vector difference with resolution in a 1-sample unit, respectively. When amvr_precision_idx is 2, variable AmvrShift may be determined as 6 and a calibrated first motion vector and a motion vector difference of a current block may be transformed to have resolution in a 4-sample unit. A calibrated first motion vector and a motion vector difference of a current block may be bit-shifted by 6 to the left, acquiring a first motion vector and a motion vector difference with resolution in a 4-sample unit, respectively.

At least one of the AMVR flag or the AMVR index may be signaled through a bitstream only when a predetermined condition is satisfied. Here, a predetermined condition may include at least one of the conditions described below.

The AMVR flag and/or the AMVR index may be signaled through a bitstream based on a first flag indicating whether adaptive motion vector resolution is allowed for an image unit to which a current block belongs. The image unit may refer to at least one of a sequence, a picture or a slice. The first flag may be signaled in at least one of a sequence parameter set, a picture parameter set, a picture header or a slice header of a bitstream.

As an example, when the first flag is a first value, the AMVR flag and/or the AMVR index may be signaled through a bitstream and when the first flag is a second value, the AMVR flag and/or the AMVR index may not be signaled through a bitstream.

A decoding device may obtain a Motion Vector Sign Derivation (MVSD) index S840. According to an embodiment of the present disclosure, instead of individually signaling the sign information of a horizontal direction (x-axis) and a vertical direction (y-axis) of a motion vector difference of each L0 and L1 for the motion vector difference information of inter prediction, a sign of a motion vector difference of each L0 and L1 may be signaled by using an index. MVSD represents a method for signaling a sign of a motion vector difference of each L0 and L1 by using an index, and a MVSD index represents an index used here.

As an embodiment, a MVSD index may indicate one of the x, y sign combinations of (+, +), (+, −), (−, +), (−, −). In addition, as an example, a x, y sign combination of (+, +), (+, −), (−, +), (−, −) may be ordered (or reordered) based on template matching. In this case, a cost may be compared based on template matching and ordered in ascending order. A MVSD index may indicate a specific candidate within an ordered sign combination candidate group.

According to an embodiment of the present disclosure, the above-described MHP mode may not be applied when at least one of the conditions in the following Table 2 is satisfied by considering trade-off between performance and complexity. In other words, a MHP unavailability condition as in the following Table 2 may be defined.

TABLE 2

| |
|---|
| slice_type != B |
| IBC mode |
| CIIP Mode |
| GPM(geometric partitioning mode) |
| TM(template matching)-MERGE mode |
| BM(bilateral matching)-MERGE mode |
| !merge_flag && bcw_idx == Default (Equal weight) |
| !merge_flag && affine && imv != 0 |
| cbWidth * cbHeight <= 64 \|\| min(cbWidth, cbHeight) < 8 |

When one or more of the conditions defined in Table 2 are satisfied, a MHP mode may not be applied. When one or more of the conditions defined in Table 2 are satisfied, a MHP mode may be unavailable and in this case, a MHP flag and MHP information indicating whether to apply a MHP mode may not be parsed.

MHP information may be parsed from a bitstream in the same order as shown in FIG. 8 (i.e., S810). However, when a MHP unavailability condition as in Table 2 described above is defined, MHP information may have parsing dependency according to a corresponding condition.

Specifically, when a merge flag value is not 1, an affine mode is applied and an imv value is not 0 (i.e., when an AMVR flag value is not 0), a MHP mode may not be available and may not be parsed from a bitstream. In other words, as in Table 2, when AMVR information is defined as a MHP information parsing condition, although AMVR information is obtained in S830 after S810, there is a problem that parsing dependency occurs as AMVR information is confirmed as a MHP information parsing condition to parse MHP information in S810 which is a step before S830.

Accordingly, in order to solve this problem, considering inter prediction-related syntax parsing order as in FIG. 8, a MHP information parsing condition may be newly defined. As an embodiment, in order to parse MHP information, syntax information acquired in a step after S810 may not be considered as a MHP information parsing condition. For example, AMVR information may not be considered to parse MHP information. As an example, a MHP unavailability condition as in Table 3 below may be defined.

TABLE 3

| |
|---|
| slice_type != B |
| IBC mode |
| CIIP Mode |
| GPM-MERGE |
| TM-MERGE mode |
| BM-MERGE mode |
| !merge_flag && bcw_idx == Default (Equal weight) |
| ~~!merge_flag && affine && imv != 0~~ |
| cbWidth * cbHeight <= 64 \|\| min(cbWidth, cbHeight) < 8 |

Referring to Table 3, a condition when a merge flag value is not 1, an affine mode is applied and an imv value is not 0 (i.e., when an AMVR flag value is not 0) may not be considered. Even when a merge flag value is not 1, an affine mode is applied and an imv value is not 0 (i.e., when an AMVR flag value is not 0), MHP information may be parsed.

In addition, as an embodiment, MVSD may not be applied when MHP is applied, and MVSD may be applied when MHP is not applied. In this case, as in Table 4 below, MHP information may be referred to in a process of parsing MVD and a MVD sign index.

TABLE 4

```
if (MHP || MVSD is not available)
{
  MVD + sign parsing
}
Else {
  MVD parsing
  MV sign index parsing
}
```

Referring to Table 4, when MHP is not available and MVSD is available, MVSD may be used. In this case, there is a problem that dependency occurs between MHP and MVSD. Accordingly, in order to remove dependency between MHP and MVSD, whether to apply may be determined by considering whether MVD and MVSD are available regardless of MHP as in Table 5 below.

TABLE 5

```
if (MVSD is not available)
{
  MVD + sign parsing
}
Else {
  MVD parsing
  MV sign index parsing
}
```

Referring to Table 5, whether MHP is available may not be considered to parse a MVSD index or a MVD sign. It may improve parsing dependency and increase compression efficiency. Specifically, the degree of freedom of parsing order of MHP information may be improved by removing parsing dependency between MHP and MVSD, and compression efficiency according to a change in the parsing order of AMVR information, a MVSD index and MHP prediction information described below may be improved. In addition, according to an embodiment of the present disclosure, parsing order may be changed to solve parsing dependency. As described above, parsing dependency may be a problem between MHP information and AMVR information. In addition, parsing dependency may be a problem as a sign of MVD is parsed when MHP information does not exist. In order to solve this problem, a method for changing parsing order is described.

In an embodiment, a decoding device may first obtain (or parse) a weight index. Afterwards, a decoding device may obtain basic prediction information. And, a decoding device may obtain AMVR information. And, a decoding device may obtain a MVSD index. Afterwards, a decoding device may obtain MHP information. In other words, in this embodiment, parsing order in FIG. 8 above may be changed to the order of S800, S820, S830, S840, S810. According to this embodiment, the above-described parsing dependency may be improved by obtaining AMVR information before parsing MHP information.

In addition, in an embodiment, a decoding device may first obtain a weight index. Afterwards, a decoding device may obtain basic prediction information. And, a decoding device may obtain a MVSD index. And, a decoding device may obtain AMVR information. Afterwards, a decoding device may obtain MHP information. In other words, in this embodiment, parsing order in FIG. 8 above may be changed to the order of S800, S820, S840, S830, S810. According to this embodiment, the above-described parsing dependency may be improved by obtaining AMVR information before parsing MHP information.

In addition, in an embodiment, a decoding device may first obtain basic prediction information. And, a decoding device may obtain AMVR information. And, a decoding device may obtain a MVSD index. Afterwards, a decoding device may obtain a weight index. Afterwards, a decoding device may obtain MHP information. In other words, in this embodiment, parsing order in FIG. 8 above may be changed to the order of S820, S830, S840, S800, S810. According to this embodiment, the above-described parsing dependency may be improved by obtaining AMVR information before parsing MHP information.

In addition, in an embodiment, a decoding device may first obtain basic prediction information. And, a decoding device may obtain a MVSD index. And, a decoding device may obtain AMVR information. Afterwards, a decoding device may obtain a weight index. Afterwards, a decoding device may obtain MHP information. In other words, in this embodiment, parsing order in FIG. 8 above may be changed to the order of S820, S840, S830, S800, S810. According to this embodiment, the above-described parsing dependency may be improved by obtaining AMVR information before parsing MHP information.

As described above, in order to solve parsing dependency described above, the parsing order of MHP information may be changed to after AMVR information parsing. In addition, as described above, when parsing MVD and MVSD that refer to MHP information, they may be changed not to refer to MHP information. In addition, as in Table 2 and Table 3 above, when parsing MHP information only when a BCW index is not a default value, MHP information may be parsed after the parsing of a BCW index, but that order may be the same as an embodiment described above.

Figure 9:
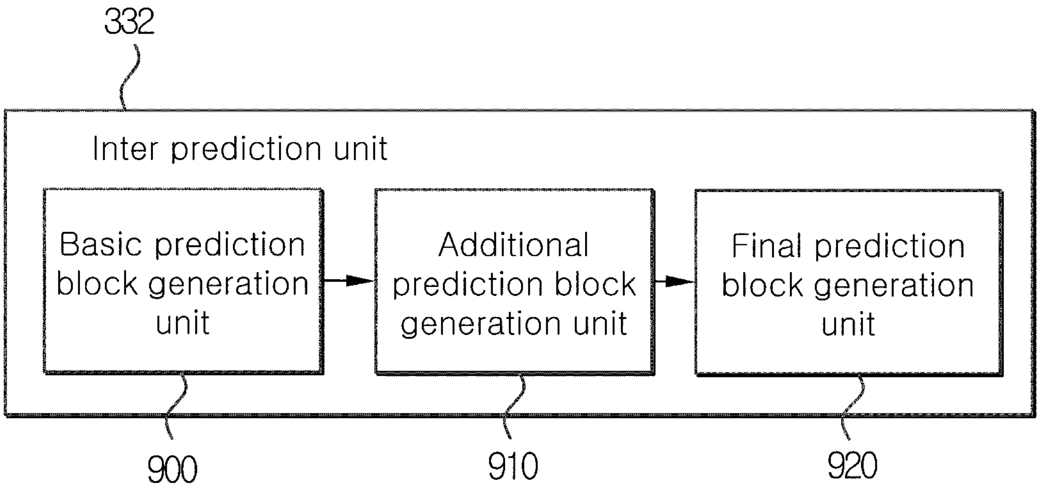
FIG. 9 shows a rough configuration of an inter predictor 332 that performs an inter prediction method according to the present disclosure.

FIG. 9 shows a rough configuration of an inter predictor 332 that performs an inter prediction method according to the present disclosure.

Referring to FIG. 9, an inter predictor 332 may include a basic prediction block generation unit 900, an additional prediction block generation unit 910 and a final prediction block generation unit 920.

A basic prediction block generation unit 900 may perform bidirectional prediction to generate a basic prediction block. When a MHP mode is applied, a basic prediction block generation unit 900 may generate and combine an additional prediction block other than a prediction block generated (or derived) by bidirectional prediction. As an example, a basic prediction block may include a L0 prediction block and/or a L1 prediction block. In the present disclosure, a basic prediction block may be referred to as an initial prediction block, a temporary prediction block, a reference prediction block, etc. In addition, as an example, a basic prediction block may be a prediction block obtained by weighted summing L0 and L1 prediction blocks.

In an embodiment, a weight may be used for the weighted sum of L0 and L1 prediction blocks. As a weight used for weighted prediction, a weight may be collectively referred to as Bi-prediction with CU based Weights (BCW) or CU based Weights (CW). A weight may be derived from a weight candidate list. A weight candidate list may include a plurality of weight candidates and may be predefined in an encoding/decoding device.

A weight candidate may be a set of weights (i.e., a first weight and a second weight) representing weights applied to each bidirectional prediction block or may be a weight applied to a prediction block in any one of both directions. When only a weight applied to a prediction block in any one direction is derived from a weight candidate list, a weight applied to a prediction block in the other direction may be derived based on a weight derived from a weight candidate list. For example, a weight applied to a prediction block in the other direction may be derived by subtracting a weight derived from a weight candidate list from a predetermined value.

In an embodiment, a weight index indicating a weight used for weighted prediction of a current block may be derived in a weight candidate list. In the present disclosure, a weight index may be referred to as bcw_idx, a bcw index. A weight index may be derived by a decoding device or may be signaled from an encoding device. When derived by a decoding device, a weight index may be derived as a weight index of a specific merge candidate in a merge candidate list.

As an example, a specific merge candidate may be specified by a merge index in a merge candidate list.

An additional prediction block generation unit 910 may generate an additional prediction block based on a MHP mode. An additional prediction block generation unit 910 may generate an additional prediction block other than a basic prediction block and combine (or weighted sum) a basic prediction block and a generated additional prediction block.

As an embodiment, an additional prediction block generation unit 910 may generate up to a predefined number of additional prediction blocks when a MHP mode is applied. In other words, an additional prediction block generation unit 910 may combine (or weighted sum) additional prediction blocks less than or equal to a predefined number to a basic prediction block. As an example, the predefined number may be 2. Alternatively, as an example, the predefined number may be one of 1, 2, 3 and 4. The predefined number may be referred to as the maximum number of MHP.

In addition, when a plurality of additional prediction blocks are combined, a plurality of additional prediction blocks may be sequentially weighted summed to a basic prediction block. For example, when up to 2 additional prediction blocks are generated, a basic prediction block and a first additional prediction block may be weighted summed to generate a prediction block and the generated prediction block and a second additional prediction block may be weighted summed to generate a final prediction block. A prediction block generated by weighted summing a basic prediction block and a first additional prediction block may be referred to as an intermediate prediction block.

Alternatively, when a plurality of additional prediction blocks are combined, a basic prediction block and a plurality of generated additional prediction blocks may be weighted summed in a lump. In other words, after a plurality of additional prediction blocks are generated, a weight may be applied to each of a plurality of additional prediction blocks and a basic prediction block (or a L0 prediction block and a L1 prediction block) and weighted summed in a lump.

In addition, as an embodiment, an additional prediction block generation unit 910 may determine whether to apply MHP. As an example, whether to apply MHP may be explicitly signaled or may be implicitly derived by a decoding device.

In addition, as an embodiment, whether to apply MHP may be signaled from an encoding device to a decoding device. For example, a MHP flag indicating whether to apply MHP may be signaled from an encoding device to a decoding device. In this case, a condition for signaling/parsing a MHP flag may be defined in advance. A signaling/parsing condition of the MHP flag may be an availability condition of MHP. When the signaling/parsing condition is satisfied, a decoding device may parse a MHP flag from a bitstream. Alternatively, as an embodiment, whether to apply MHP may be derived by a decoding device based on predefined encoding information. As an example, whether to apply MHP may be defined in the same manner as a MHP availability condition (or a signaling/parsing condition) described below.

In addition, as an embodiment, an additional prediction block generation unit 910 may obtain MHP information (or may be referred to as MHP prediction information) to generate an additional prediction block. As an example, MHP information may include weight information and/or prediction information. A reference block according to a MHP mode, i.e., an additional prediction block, may be derived based on the prediction information and an additional prediction block derived based on the weight information may be weighted summed with a basic prediction block (or an intermediate prediction block). In addition, as an example, MHP information may further include a MHP flag indicating whether to apply MHP.

As an example, the prediction information may include mode information used to derive an additional prediction block and motion information according to a mode. Mode information may be inter prediction mode information indicating whether it is a merge mode or an AMVP mode. For example, the mode information may be a merge flag. In other words, a merge mode or an AMVP mode may be used to derive an additional prediction block and a flag syntax element for indicating it may be signaled. Alternatively, a predefined mode among a merge mode or an AMVP mode may be used to derive an additional prediction block. Alternatively, a merge mode or an AMVP mode may be selected based on predefined encoding information.

As an example, when a merge mode is used to derive an additional prediction block, the prediction information may include a merge index. A merge index may specify a merge candidate in a merge candidate list. When an AMVP mode is used to derive an additional prediction block, the prediction information may include a motion vector predictor flag, a reference index and motion vector difference information. A motion vector predictor flag may specify a candidate in a motion vector predictor candidate list.

A final prediction block generation unit 920 may generate a final prediction block by weighted summing a basic prediction block and an additional prediction block. As described above, the number of additional prediction blocks may be less than or equal to a predefined number. For example, when the number of additional prediction blocks is 2, a final prediction block may be a block in which a basic prediction block and two additional prediction blocks are weighted summed.

As described above, when a plurality of additional prediction blocks are combined, a plurality of additional prediction blocks may be sequentially weighted summed to a basic prediction block, or a basic prediction block and a plurality of generated additional prediction blocks may be weighted summed in a lump.

Meanwhile, as an embodiment, syntax parsing order related to a variety of inter prediction modes including a MHP mode may be defined or changed. In this case, a method described in FIG. 8 may be applied and an overlapping description is omitted here.

In addition, as an embodiment, considering inter prediction-related syntax parsing order as in FIG. 8, a MHP information parsing condition may be newly defined. For example, AMVR information may not be considered to parse MHP information. In this case, a method described in FIG. 8, Table 2 and Table 3 may be applied, and an overlapping description is omitted here.

In addition, as an embodiment, whether to apply may be determined by considering whether MVD and MVSD are available regardless of MHP. In this case, a method described in FIG. 8, Table 4 and Table 5 may be applied, and an overlapping description is omitted here.

In addition, as an example, the parsing dependency can be an issue between MHP information and AMVR information as described above. In addition, parsing dependency may be a problem as a sign of MVD is parsed when MHP information does not exist. In order to solve this problem, parsing order may be changed in various ways. In this case, a method described in FIG. 8 may be applied and an overlapping description is omitted here.

Figure 10:
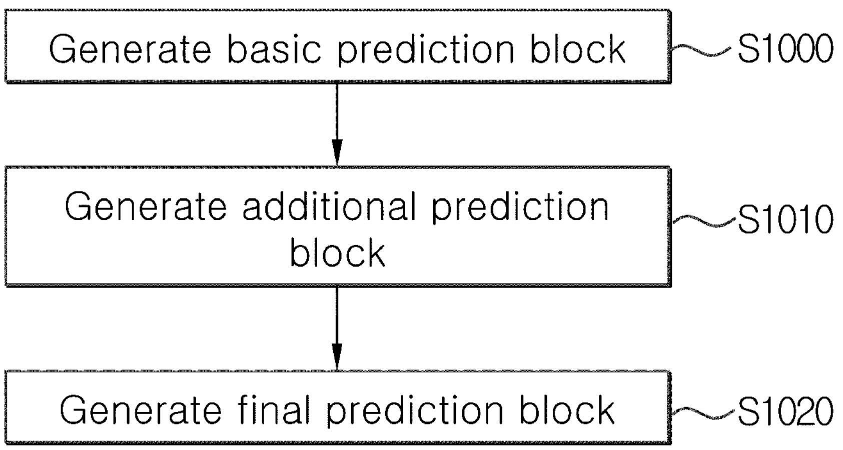
FIG. 10 shows an inter prediction method performed by an encoding device 200 as an embodiment according to the present disclosure.

FIG. 10 shows an inter prediction method performed by an encoding device 200 as an embodiment according to the present disclosure.

Referring to FIG. 10, an encoding device may perform bidirectional prediction to generate a basic prediction block S1000. When a MHP mode is applied, an encoding device may generate and combine an additional prediction block other than a prediction block generated (or derived) by bidirectional prediction. As an example, a basic prediction block may include a L0 prediction block and/or a L1 prediction block. In the present disclosure, a basic prediction block may be referred to as an initial prediction block, a temporary prediction block, a reference prediction block, etc. In addition, as an example, a basic prediction block may be a prediction block obtained by weighted summing L0 and L1 prediction blocks.

In an embodiment, a weight may be used for the weighted sum of L0 and L1 prediction blocks. As a weight used for weighted prediction, a weight may be collectively referred to as Bi-prediction with CU based Weights (BCW) or CU based Weights (CW). A weight may be derived from a weight candidate list. A weight candidate list may include a plurality of weight candidates and may be predefined in an encoding/decoding device.

A weight candidate may be a set of weights (i.e., a first weight and a second weight) representing weights applied to each bidirectional prediction block or may be a weight applied to a prediction block in any one of both directions. When only a weight applied to a prediction block in any one direction is derived from a weight candidate list, a weight applied to a prediction block in the other direction may be derived based on a weight derived from a weight candidate list. For example, a weight applied to a prediction block in the other direction may be derived by subtracting a weight derived from a weight candidate list from a predetermined value.

In an embodiment, a weight index indicating a weight used for weighted prediction of a current block may be derived in a weight candidate list. In the present disclosure, a weight index may be referred to as bcw_idx, a bcw index. A weight index may be derived by a decoding device or may be signaled from an encoding device. When derived by a decoding device, a weight index may be derived as a weight index of a specific merge candidate in a merge candidate list. As an example, a specific merge candidate may be specified by a merge index in a merge candidate list.

An encoding device may generate an additional prediction block based on a MHP mode S1010. An encoding device may generate an additional prediction block other than a basic prediction block and combine (or weighted sum) a basic prediction block and a generated additional prediction block.

As an embodiment, when a MHP mode is applied, an encoding device may generate up to a predefined number of additional prediction blocks. In other words, an encoding device may combine (or weighted sum) additional prediction blocks less than or equal to a predefined number to a basic prediction block. As an example, the predefined number may be 2. Alternatively, as an example, the predefined number may be one of 1, 2, 3 and 4. The predefined number may be referred to as the maximum number of MHP.

In addition, when a plurality of additional prediction blocks are combined, a plurality of additional prediction blocks may be sequentially weighted summed to a basic prediction block. For example, when up to 2 additional prediction blocks are generated, a basic prediction block and a first additional prediction block may be weighted summed to generate a prediction block and the generated prediction block and a second additional prediction block may be weighted summed to generate a final prediction block. A prediction block generated by weighted summing a basic prediction block and a first additional prediction block may be referred to as an intermediate prediction block.

Alternatively, when a plurality of additional prediction blocks are combined, a basic prediction block and a plurality of generated additional prediction blocks may be weighted summed in a lump. In other words, after a plurality of additional prediction blocks are generated, a weight may be applied to each of a plurality of additional prediction blocks and a basic prediction block (or a L0 prediction block and a L1 prediction block) and weighted summed in a lump.

In addition, as an embodiment, an encoding device may determine whether to apply MHP. In this case, a step of determining whether to apply MHP may be added before S1010. As an example, whether to apply MHP may be explicitly signaled or may be implicitly derived by a decoding device.

In addition, as an embodiment, whether to apply MHP may be signaled from an encoding device to a decoding device. For example, a MHP flag indicating whether to apply MHP may be signaled from an encoding device to a decoding device. In this case, a condition for signaling/parsing a MHP flag may be defined in advance. A signaling/parsing condition of the MHP flag may be an availability condition of MHP. When the signaling/parsing condition is satisfied, an encoding device may signal a MHP flag from a bitstream. Alternatively, as an embodiment, whether to apply MHP may be derived by a decoding device based on predefined encoding information. As an example, whether to apply MHP may be defined in the same manner as a MHP availability condition (or a signaling/parsing condition) described below.

In addition, as an embodiment, an encoding device may obtain MHP information (or may be referred to as MHP prediction information) to generate an additional prediction block. As an example, MHP information may include weight information and/or prediction information. A reference block according to a MHP mode, i.e., an additional prediction block, may be derived based on the prediction information and an additional prediction block derived based on the weight information may be weighted summed with a basic prediction block (or an intermediate prediction block). In addition, as an example, MHP information may further include a MHP flag indicating whether to apply MHP.

As an example, the prediction information may include mode information used to derive an additional prediction block and motion information according to a mode. Mode information may be inter prediction mode information indicating whether it is a merge mode or an AMVP mode. For example, the mode information may be a merge flag. In other words, a merge mode or an AMVP mode may be used to derive an additional prediction block and a flag syntax element for indicating it may be signaled. Alternatively, a predefined mode among a merge mode or an AMVP mode may be used to derive an additional prediction block. Alternatively, a merge mode or an AMVP mode may be selected based on predefined encoding information.

As an example, when a merge mode is used to derive an additional prediction block, the prediction information may include a merge index. A merge index may specify a merge candidate in a merge candidate list. When an AMVP mode is used to derive an additional prediction block, the prediction information may include a motion vector predictor flag, a reference index and motion vector difference information.

A motion vector predictor flag may specify a candidate in a motion vector predictor candidate list.

An encoding device may generate a final prediction block by weighted summing a basic prediction block and an additional prediction block. As described above, the number of additional prediction blocks may be less than or equal to a predefined number. For example, when the number of additional prediction blocks is 2, a final prediction block may be a block in which a basic prediction block and two additional prediction blocks are weighted summed.

As described above, when a plurality of additional prediction blocks are combined, a plurality of additional prediction blocks may be sequentially weighted summed to a basic prediction block, or a basic prediction block and a plurality of generated additional prediction blocks may be weighted summed in a lump.

Meanwhile, as an embodiment, syntax parsing order related to a variety of inter prediction modes including a MHP mode may be defined or changed. In this case, a method described in FIG. 8 may be applied and an overlapping description is omitted here.

In addition, as an embodiment, considering inter prediction-related syntax parsing order as in FIG. 8, a MHP information parsing condition may be newly defined. For example, AMVR information may not be considered to parse MHP information. In this case, a method described in FIG. 8, Table 2 and Table 3 may be applied, and an overlapping description is omitted here.

In addition, as an embodiment, whether to apply may be determined by considering whether MVD and MVSD are available regardless of MHP. In this case, a method described in FIG. 8, Table 4 and Table 5 may be applied, and an overlapping description is omitted here.

In addition, as an example, the parsing dependency can be an issue between MHP information and AMVR information as described above. In addition, parsing dependency may be a problem as a sign of MVD is parsed when MHP information does not exist. In order to solve this problem, parsing order may be changed in various ways. In this case, a method described in FIG. 8 may be applied and an overlapping description is omitted here.

Figure 11:
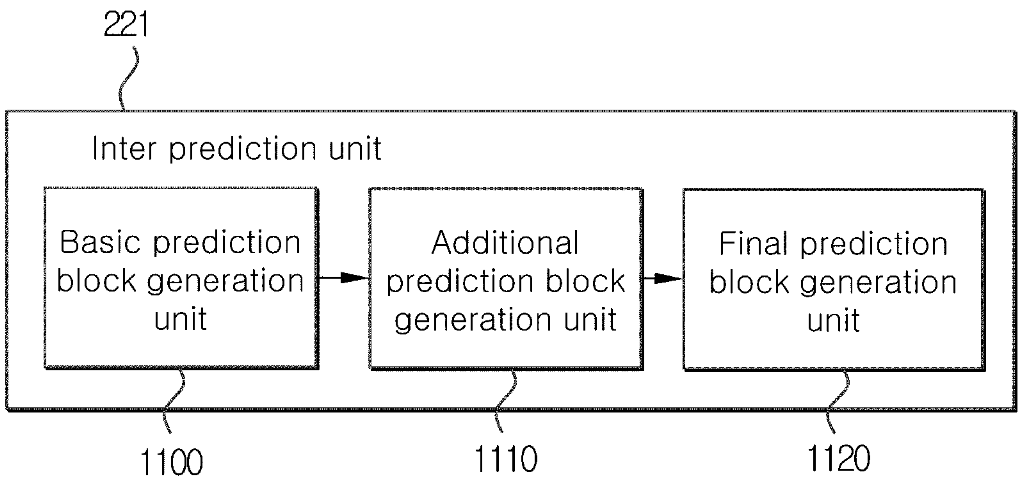
FIG. 11 shows a rough configuration of an inter predictor 221 that performs an inter prediction method according to the present disclosure.

FIG. 11 shows a rough configuration of an inter predictor 221 that performs an inter prediction method according to the present disclosure.

Referring to FIG. 11, an inter predictor 221 may include a basic prediction block generation unit 1100, an additional prediction block generation unit 1110 and a final prediction block generation unit 1120.

A basic prediction block generation unit 1100 may perform bidirectional prediction to generate a basic prediction block. When a MHP mode is applied, a basic prediction block generation unit 1100 may generate and combine an additional prediction block other than a prediction block generated (or derived) by bidirectional prediction. As an example, a basic prediction block may include a L0 prediction block and/or a L1 prediction block. In the present disclosure, a basic prediction block may be referred to as an initial prediction block, a temporary prediction block, a reference prediction block, etc. In addition, as an example, a basic prediction block may be a prediction block obtained by weighted summing L0 and L1 prediction blocks.

In an embodiment, a weight may be used for the weighted sum of L0 and L1 prediction blocks. As a weight used for weighted prediction, a weight may be collectively referred to as Bi-prediction with CU based Weights (BCW) or CU based Weights (CW). A weight may be derived from a weight candidate list. A weight candidate list may include a plurality of weight candidates and may be predefined in an encoding/decoding device.

A weight candidate may be a set of weights (i.e., a first weight and a second weight) representing weights applied to each bidirectional prediction block or may be a weight applied to a prediction block in any one of both directions. When only a weight applied to a prediction block in any one direction is derived from a weight candidate list, a weight applied to a prediction block in the other direction may be derived based on a weight derived from a weight candidate list. For example, a weight applied to a prediction block in the other direction may be derived by subtracting a weight derived from a weight candidate list from a predetermined value.

In an embodiment, a weight index indicating a weight used for weighted prediction of a current block may be derived in a weight candidate list. In the present disclosure, a weight index may be referred to as bcw_idx, a bcw index. A weight index may be derived by a decoding device or may be signaled from an encoding device. When derived by a decoding device, a weight index may be derived as a weight index of a specific merge candidate in a merge candidate list. As an example, a specific merge candidate may be specified by a merge index in a merge candidate list.

An additional prediction block generation unit 1110 may generate an additional prediction block based on a MHP mode. An additional prediction block generation unit 1110 may generate an additional prediction block other than a basic prediction block and combine (or weighted sum) a basic prediction block and a generated additional prediction block.

As an embodiment, an additional prediction block generation unit 1110 may generate up to a predefined number of additional prediction blocks when a MHP mode is applied. In other words, an additional prediction block generation unit 1110 may combine (or weighted sum) additional prediction blocks less than or equal to a predefined number to a basic prediction block. As an example, the predefined number may be 2. Alternatively, as an example, the predefined number may be one of 1, 2, 3 and 4. The predefined number may be referred to as the maximum number of MHP.

In addition, when a plurality of additional prediction blocks are combined, a plurality of additional prediction blocks may be sequentially weighted summed to a basic prediction block. For example, when up to 2 additional prediction blocks are generated, a basic prediction block and a first additional prediction block may be weighted summed to generate a prediction block and the generated prediction block and a second additional prediction block may be weighted summed to generate a final prediction block. A prediction block generated by weighted summing a basic prediction block and a first additional prediction block may be referred to as an intermediate prediction block.

Alternatively, when a plurality of additional prediction blocks are combined, a basic prediction block and a plurality of generated additional prediction blocks may be weighted summed in a lump. In other words, after a plurality of additional prediction blocks are generated, a weight may be applied to each of a plurality of additional prediction blocks and a basic prediction block (or a L0 prediction block and a L1 prediction block) and weighted summed in a lump.

In addition, as an embodiment, an additional prediction block generation unit 910 may determine whether to apply MHP. As an example, whether to apply MHP may be explicitly signaled or may be implicitly derived by a decoding device.

In addition, as an embodiment, whether to apply MHP may be signaled from an encoding device to a decoding device. For example, a MHP flag indicating whether to apply MHP may be signaled from an encoding device to a decoding device. In this case, a condition for signaling/parsing a MHP flag may be defined in advance. A signaling/parsing condition of the MHP flag may be an availability condition of MHP. When the signaling/parsing condition is satisfied, a decoding device may parse a MHP flag from a bitstream. Alternatively, as an embodiment, whether to apply MHP may be derived by a decoding device based on predefined encoding information. As an example, whether to apply MHP may be defined in the same manner as a MHP availability condition (or a signaling/parsing condition) described below.

In addition, as an embodiment, an additional prediction block generation unit 1110 may obtain MHP information (or may be referred to as MHP prediction information) to generate an additional prediction block. As an example, MHP information may include weight information and/or prediction information. A reference block according to a MHP mode, i.e., an additional prediction block, may be derived based on the prediction information and an additional prediction block derived based on the weight information may be weighted summed with a basic prediction block (or an intermediate prediction block). In addition, as an example, MHP information may further include a MHP flag indicating whether to apply MHP.

As an example, the prediction information may include mode information used to derive an additional prediction block and motion information according to a mode. Mode information may be inter prediction mode information indicating whether it is a merge mode or an AMVP mode. For example, the mode information may be a merge flag. In other words, a merge mode or an AMVP mode may be used to derive an additional prediction block and a flag syntax element for indicating it may be signaled. Alternatively, a predefined mode among a merge mode or an AMVP mode may be used to derive an additional prediction block. Alternatively, a merge mode or an AMVP mode may be selected based on predefined encoding information.

As an example, when a merge mode is used to derive an additional prediction block, the prediction information may include a merge index. A merge index may specify a merge candidate in a merge candidate list. When an AMVP mode is used to derive an additional prediction block, the prediction information may include a motion vector predictor flag, a reference index and motion vector difference information. A motion vector predictor flag may specify a candidate in a motion vector predictor candidate list.

A final prediction block generation unit 1120 may generate a final prediction block by weighted summing a basic prediction block and an additional prediction block. As described above, the number of additional prediction blocks may be less than or equal to a predefined number. For example, when the number of additional prediction blocks is 2, a final prediction block may be a block in which a basic prediction block and two additional prediction blocks are weighted summed.

As described above, when a plurality of additional prediction blocks are combined, a plurality of additional prediction blocks may be sequentially weighted summed to a basic prediction block, or a basic prediction block and a plurality of generated additional prediction blocks may be weighted summed in a lump.

Meanwhile, as an embodiment, syntax parsing order related to a variety of inter prediction modes including a MHP mode may be defined or changed. In this case, a method described in FIG. 8 may be applied and an overlapping description is omitted here.

In addition, as an embodiment, considering inter prediction-related syntax parsing order as in FIG. 8, a MHP information parsing condition may be newly defined. For example, AMVR information may not be considered to parse MHP information. In this case, a method described in FIG. 8, Table 2 and Table 3 may be applied, and an overlapping description is omitted here.

In addition, as an embodiment, whether to apply may be determined by considering whether MVD and MVSD are available regardless of MHP. In this case, a method described in FIG. 8, Table 4 and Table 5 may be applied, and an overlapping description is omitted here.

In addition, as an example, the parsing dependency can be an issue between MHP information and AMVR information as described above. In addition, parsing dependency may be a problem as a sign of MVD is parsed when MHP information does not exist. In order to solve this problem, parsing order may be changed in various ways. In this case, a method described in FIG. 8 may be applied and an overlapping description is omitted here.

In the above-described embodiment, methods are described based on a flowchart as a series of steps or blocks, but a corresponding embodiment is not limited to the order of steps, and some steps may occur simultaneously or in different order with other steps as described above. In addition, those skilled in the art may understand that steps shown in a flowchart are not exclusive, and that other steps may be included or one or more steps in a flowchart may be deleted without affecting the scope of embodiments of the present disclosure.

The above-described method according to embodiments of the present disclosure may be implemented in a form of software, and an encoding device and/or a decoding device according to the present disclosure may be included in a device which performs image processing such as a TV, a computer, a smartphone, a set top box, a display device, etc.

In the present disclosure, when embodiments are implemented as software, the above-described method may be implemented as a module (a process, a function, etc.) that performs the above-described function. A module may be stored in a memory and may be executed by a processor. A memory may be internal or external to a processor, and may be connected to a processor by a variety of well-known means. A processor may include an application-specific integrated circuit (ASIC), another chipset, a logic circuit and/or a data processing device. A memory may include a read-only memory (ROM), a random access memory (RAM), a flash memory, a memory card, a storage medium and/or another storage device. In other words, embodiments described herein may be performed by being implemented on a processor, a microprocessor, a controller or a chip. For example, functional units shown in each drawing may be performed by being implemented on a computer, a processor, a microprocessor, a controller or a chip. In this case, information for implementation (ex. information on instructions) or an algorithm may be stored in a digital storage medium.

In addition, a decoding device and an encoding device to which embodiment(s) of the present disclosure are applied may be included in a multimedia broadcasting transmission and reception device, a mobile communication terminal, a home cinema video device, a digital cinema video device, a surveillance camera, a video conversation device, a real-time communication device like a video communication, a mobile streaming device, a storage medium, a camcorder, a device for providing video on demand (VOD) service, an over the top video (OTT) device, a device for providing Internet streaming service, a three-dimensional (3D) video device, a virtual reality (VR) device, an argumente reality (AR) device, a video phone video device, a transportation terminal (ex. a vehicle (including an autonomous vehicle) terminal, an airplane terminal, a ship terminal, etc.) and a medical video device, etc., and may be used to process a video signal or a data signal. For example, an over the top video (OTT) device may include a game console, a blu-ray player, an Internet-connected TV, a home theater system, a smartphone, a tablet PC, a digital video recorder (DVR), etc.

In addition, a processing method to which embodiment(s) of the present disclosure are applied may be produced in a form of a program executed by a computer and may be stored in a computer-readable recording medium. Multimedia data having a data structure according to embodiment(s) of the present disclosure may be also stored in a computer-readable recording medium. The computer-readable recording medium includes all types of storage devices and distributed storage devices that store computer-readable data. The computer-readable recording medium may include, for example, a blu-ray disk (BD), an universal serial bus (USB), ROM, PROM, EPROM, EEPROM, RAM, CD-ROM, a magnetic tape, a floppy disk and an optical media storage device. In addition, the computer-readable recording medium includes media implemented in a form of a carrier wave (e.g., transmission via the Internet). In addition, a bitstream generated by an encoding method may be stored in a computer-readable recording medium or may be transmitted through a wired or wireless communication network.

In addition, embodiment(s) of the present disclosure may be implemented by a computer program product by a program code, and the program code may be executed on a computer by embodiment(s) of the present disclosure. The program code may be stored on a computer-readable carrier.

Figure 12:
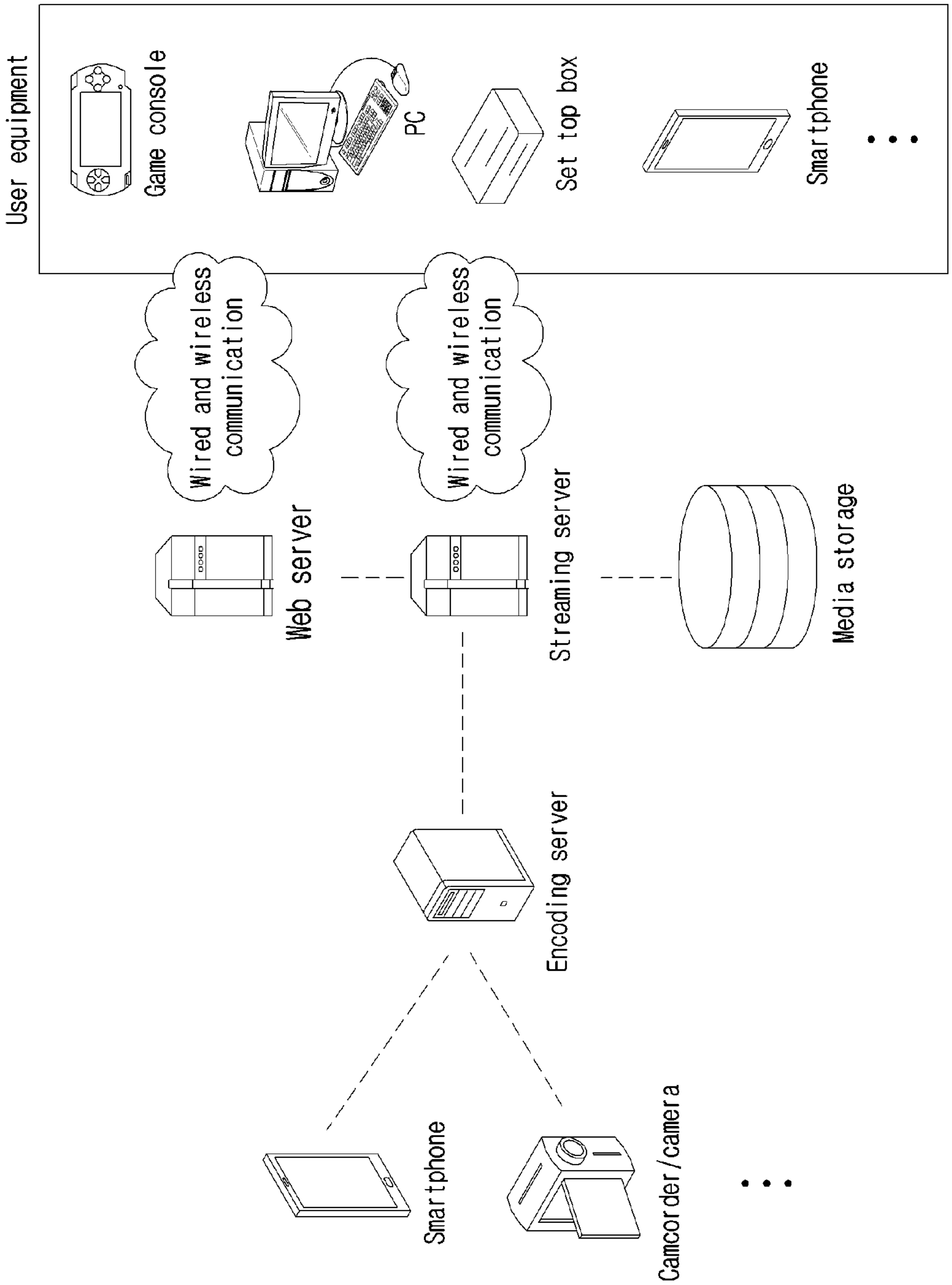
FIG. 12 shows an example of a contents streaming system to which embodiments of the present disclosure may be applied.

FIG. 12 shows an example of a contents streaming system to which embodiments of the present disclosure may be applied.

Referring to FIG. 12, a contents streaming system to which embodiment(s) of the present disclosure are applied may largely include an encoding server, a streaming server, a web server, a media storage, a user device and a multimedia input device.

The encoding server generates a bitstream by compressing contents input from multimedia input devices such as a smartphone, a camera, a camcorder, etc. into digital data and transmits it to the streaming server. As another example, when multimedia input devices such as a smartphone, a camera, a camcorder, etc. directly generate a bitstream, the encoding server may be omitted.

The bitstream may be generated by an encoding method or a bitstream generation method to which embodiment(s) of the present disclosure are applied, and the streaming server may temporarily store the bitstream in a process of transmitting or receiving the bitstream.

The streaming server transmits multimedia data to a user device based on a user's request through a web server, and the web server serves as a medium to inform a user of what service is available. When a user requests desired service from the web server, the web server delivers it to a streaming server, and the streaming server transmits multimedia data to a user. In this case, the contents streaming system may include a separate control server, and in this case, the control server controls a command/a response between each device in the content streaming system.

The streaming server may receive contents from a media storage and/or an encoding server. For example, when contents is received from the encoding server, the contents may be received in real time. In this case, in order to provide smooth streaming service, the streaming server may store the bitstream for a certain period of time.

An example of the user device may include a mobile phone, a smart phone, a laptop computer, a digital broadcasting terminal, a personal digital assistants (PDAs), a portable multimedia players (PMP), a navigation, a slate PC, a Tablet PC, an ultrabook, a wearable device (e.g., a smartwatch, a smart glass, a head mounted display (HMD), a digital TV, a desktop, a digital signage, etc.

Each server in the contents streaming system may be operated as a distributed server, and in this case, data received from each server may be distributed and processed.

The claims set forth herein may be combined in various ways. For example, a technical characteristic of a method claim of the present disclosure may be combined and implemented as a device, and a technical characteristic of a device claim of the present disclosure may be combined and implemented as a method. In addition, a technical characteristic of a method claim of the present disclosure and a technical characteristic of a device claim may be combined and implemented as a device, and a technical characteristic of a method claim of the present disclosure and a technical characteristic of a device claim may be combined and implemented as a method.

The invention claimed is:

1. An image decoding method, the method comprising:

performing a bidirectional prediction based on a first inter prediction mode to generate a basic prediction block of a current block;

acquiring a Motion Vector Sign Derivation (MVSD) index specifying a candidate among a plurality of sign combination candidates from a bitstream;

acquiring information on a second inter prediction mode from the bitstream;

generating an additional prediction block of the current block based on the second inter prediction mode; and generating a final prediction block of the current block by weighted summing of the basic prediction block and the additional prediction block, wherein acquiring the MVSD index is performed before acquiring the information on the second inter prediction mode.

2. The method of claim 1, wherein:

the first inter prediction includes at least one of a merge mode, an AMVP mode or a merge-AMVP combined mode.

3. The method of claim 2, wherein:

the second inter prediction mode includes a multi-hypothesis prediction mode.

4. The method of claim 1, wherein:

when a plurality of the additional prediction blocks are generated, the final prediction block is generated by sequentially weighted summing the plurality of the additional prediction blocks to the basic prediction block.

5. The method of claim 1, wherein:

the information on the second inter prediction mode includes at least one of weight information or prediction information, the weight information represents information indicating a weight used for the weighted sum of the additional prediction block, the prediction information represents information for deriving the additional prediction block.

6. The method of claim 5, wherein:

the prediction information includes a mode flag indicating whether a merge mode or an AMVP mode is used to derive the additional prediction block.

7. The method of claim 6, wherein:

when the mode flag indicates that the merge mode is used to derive the additional prediction block, the prediction information further includes a merge index, when the mode flag indicates that the AMVP mode is used to derive the additional prediction block, the prediction information includes at least one of a motion vector predictor flag, a reference index or motion vector difference information.

8. The method of claim 1, wherein:

the information on the second inter prediction mode is acquired from the bitstream when a predefined condition is satisfied, the predefined condition is defined without considering Adaptive Motion Vector Resolution (AMVR) information.

9. The method of claim 1, wherein:

the method further includes acquiring Adaptive Motion Vector Resolution (AMVR) information from the bitstream, acquiring the AMVR information is performed before acquiring the information on the second inter prediction mode.

10. An image encoding method, the method comprising:

performing a bidirectional prediction based on a first inter prediction mode to generate a basic prediction block of a current block;

generating an additional prediction block of the current block based on a second inter prediction mode;

generating a final prediction block of the current block by weighted summing the basic prediction block and the additional prediction block;

encoding a Motion Vector Sign Derivation (MVSD) index specifying a candidate among a plurality of sign combination candidates into a bitstream; and encoding information on the second inter prediction mode into the bitstream, wherein encoding the MVSD index is performed before encoding the information on the second inter prediction mode.

11. A transmission method of data comprising a bitstream of image information, the transmission method comprising:

obtaining the bitstream of the image information, wherein the bitstream is generated based on performing a bidirectional prediction based on a first inter prediction mode to generate a basic prediction block of a current block, generating an additional prediction block of the current block based on a second inter prediction mode, generating a final prediction block of the current block by weighted summing the basic prediction block and the additional prediction block, encoding a Motion Vector Sign Derivation (MVSD) index specifying a candidate among a plurality of sign combination candidates, and encoding information on the second inter prediction mode; and calculating a weighted sum of the basic prediction block and the additional prediction transmitting the data comprising the bitstream, wherein encoding the MVSD index is performed before encoding the information on the second inter prediction mode.

* * * * *